(12) United States Patent
Paley et al.

(10) Patent No.: US 11,561,684 B1
(45) Date of Patent: Jan. 24, 2023

(54) METHOD AND SYSTEM FOR CONFIGURING AUTOMATIC GENERATION OF NARRATIVES FROM DATA

(71) Applicant: Narrative Science Inc., Chicago, IL (US)

(72) Inventors: Andrew R. Paley, Chicago, IL (US); Nathan D. Nichols, Chicago, IL (US); Kristian J. Hammond, Chicago, IL (US)

(73) Assignee: Narrative Science Inc., Chicago, IL (US)

( * ) Notice: Subject to any disclaimer, the term of this patent is extended or adjusted under 35 U.S.C. 154(b) by 0 days.

(21) Appl. No.: 16/253,556

(22) Filed: Jan. 22, 2019

Related U.S. Application Data

(63) Continuation of application No. 14/211,444, filed on Mar. 14, 2014, now Pat. No. 10,185,477.

(60) Provisional application No. 61/799,328, filed on Mar. 15, 2013.

(51) Int. Cl.
*G06F 3/048* (2013.01)
*G06F 3/04842* (2022.01)
*G06F 3/0482* (2013.01)
*G06F 40/56* (2020.01)

(52) U.S. Cl.
CPC ........ *G06F 3/04842* (2013.01); *G06F 3/0482* (2013.01); *G06F 40/56* (2020.01)

(58) Field of Classification Search
CPC .... G06N 99/005; G06N 5/02; G06F 17/2785; G06F 17/30654; G06F 17/27; G06F 17/2705; G06F 17/248; G06F 17/24; G06F 40/186

USPC ......................................................... 704/709
See application file for complete search history.

(56) References Cited

U.S. PATENT DOCUMENTS

| | | | |
|---|---|---|---|
| 4,992,939 A | 2/1991 | Tyler |
| 5,619,631 A | 4/1997 | Schott |
| 5,687,364 A | 11/1997 | Saund et al. |
| 5,734,916 A | 3/1998 | Greenfield et al. |
| 5,794,050 A | 8/1998 | Dahlgren et al. |

(Continued)

FOREIGN PATENT DOCUMENTS

| | | |
|---|---|---|
| WO | 9630844 A1 | 10/1996 |
| WO | 2006122329 A2 | 11/2006 |

(Continued)

OTHER PUBLICATIONS

Character Writer Version 3.01, Typing Chimp Software LLC, 2012, screenshots from working program, pp. 1-19 (Year: 2012).*

(Continued)

*Primary Examiner* — Aleksey Olshannikov
(74) *Attorney, Agent, or Firm* — Thompson Coburn LLP

(57) ABSTRACT

The exemplary embodiments describe, inter alia, an apparatus comprising: a processor configured to (1) generate a plurality of graphical user interfaces (GUIs) for interaction with a user to support configuration of a narrative story generator to automatically generate a narrative story based on input data, wherein at least one of the GUIs presents content blocks comprising a story outline in a hierarchical structure, (2) evaluate configuration elements of the narrative story generated using imported sample data, and (3) generate narrative stories based on the configuration of the narrative story generator and the input data.

20 Claims, 46 Drawing Sheets

(56) References Cited

U.S. PATENT DOCUMENTS

| | | | |
|---|---|---|---|
| 5,802,495 | A | 9/1998 | Goltra |
| 5,999,664 | A | 12/1999 | Mahoney et al. |
| 6,006,175 | A | 12/1999 | Holzrichter |
| 6,144,938 | A | 11/2000 | Surace et al. |
| 6,278,967 | B1 | 8/2001 | Akers et al. |
| 6,289,363 | B1 | 9/2001 | Consolatti et al. |
| 6,651,218 | B1 | 11/2003 | Adler et al. |
| 6,757,362 | B1 | 6/2004 | Cooper et al. |
| 6,771,290 | B1 | 8/2004 | Hoyle |
| 6,917,936 | B2 | 7/2005 | Cancedda |
| 6,968,316 | B1 | 11/2005 | Hamilton |
| 6,976,031 | B1 * | 12/2005 | Toupal ............ G06F 40/186 |
| 6,976,207 | B1 | 12/2005 | Rujan et al. |
| 7,027,974 | B1 | 4/2006 | Busch et al. |
| 7,085,771 | B2 | 8/2006 | Chung et al. |
| 7,089,241 | B1 | 8/2006 | Alspector et al. |
| 7,191,119 | B2 | 3/2007 | Epstein et al. |
| 7,246,315 | B1 | 7/2007 | Andrieu et al. |
| 7,324,936 | B2 | 1/2008 | Saldanha et al. |
| 7,333,967 | B1 | 2/2008 | Bringsjord et al. |
| 7,496,567 | B1 | 2/2009 | Steichen |
| 7,496,621 | B2 | 2/2009 | Pan et al. |
| 7,577,634 | B2 | 8/2009 | Ryan et al. |
| 7,610,279 | B2 | 10/2009 | Budzik et al. |
| 7,617,199 | B2 | 11/2009 | Budzik et al. |
| 7,617,200 | B2 | 11/2009 | Budzik et al. |
| 7,627,565 | B2 | 12/2009 | Budzik et al. |
| 7,644,072 | B2 | 1/2010 | Budzik et al. |
| 7,657,518 | B2 | 2/2010 | Budzik et al. |
| 7,756,810 | B2 | 7/2010 | Nelken et al. |
| 7,778,895 | B1 | 8/2010 | Baxter et al. |
| 7,825,929 | B2 | 11/2010 | Kincaid |
| 7,836,010 | B2 | 11/2010 | Hammond et al. |
| 7,840,448 | B2 | 11/2010 | Musgrove et al. |
| 7,856,390 | B2 | 12/2010 | Schiller |
| 7,865,496 | B1 | 1/2011 | Schiller |
| 7,930,169 | B2 | 4/2011 | Billerey-Mosier |
| 8,046,226 | B2 | 10/2011 | Soble et al. |
| 8,311,863 | B1 | 11/2012 | Kemp |
| 8,355,903 | B1 | 1/2013 | Birnbaum et al. |
| 8,374,848 | B1 | 2/2013 | Birnbaum et al. |
| 8,442,940 | B1 | 5/2013 | Faletti et al. |
| 8,447,604 | B1 | 5/2013 | Chang |
| 8,495,002 | B2 | 7/2013 | Nelken et al. |
| 8,515,737 | B2 | 8/2013 | Allen |
| 8,612,208 | B2 | 12/2013 | Cooper et al. |
| 8,630,912 | B2 | 1/2014 | Seki et al. |
| 8,630,919 | B2 | 1/2014 | Baran et al. |
| 8,645,124 | B2 | 2/2014 | Karov Zangvil |
| 8,645,825 | B1 | 2/2014 | Cornea et al. |
| 8,688,434 | B1 | 4/2014 | Birnbaum et al. |
| 8,762,133 | B2 | 6/2014 | Reiter |
| 8,762,134 | B2 | 6/2014 | Reiter |
| 8,775,161 | B1 | 7/2014 | Nichols et al. |
| 8,812,311 | B2 | 8/2014 | Weber |
| 8,819,001 | B1 | 8/2014 | Zhang |
| 8,843,363 | B2 | 9/2014 | Birnbaum et al. |
| 8,886,520 | B1 | 11/2014 | Nichols et al. |
| 8,892,417 | B1 | 11/2014 | Nichols et al. |
| 8,892,419 | B2 | 11/2014 | Lundberg et al. |
| 8,903,711 | B2 | 12/2014 | Lundberg et al. |
| 8,977,953 | B1 | 3/2015 | Pierre et al. |
| 9,135,244 | B2 | 9/2015 | Reiter |
| 9,164,982 | B1 | 10/2015 | Kaeser |
| 9,208,147 | B1 | 12/2015 | Nichols et al. |
| 9,244,894 | B1 | 1/2016 | Dale et al. |
| 9,251,134 | B2 | 2/2016 | Birnbaum et al. |
| 9,323,743 | B2 | 4/2016 | Reiter |
| 9,336,193 | B2 | 5/2016 | Logan et al. |
| 9,348,815 | B1 | 5/2016 | Estes et al. |
| 9,355,093 | B2 | 5/2016 | Reiter |
| 9,396,168 | B2 | 7/2016 | Birnbaum et al. |
| 9,396,181 | B1 | 7/2016 | Sripada et al. |
| 9,396,758 | B2 | 7/2016 | Oz et al. |
| 9,405,448 | B2 | 8/2016 | Reiter |
| 9,424,254 | B2 | 8/2016 | Howald et al. |
| 9,529,795 | B2 | 12/2016 | Kondadadi et al. |
| 9,535,902 | B1 | 1/2017 | Michalak et al. |
| 9,576,009 | B1 | 2/2017 | Hammond et al. |
| 9,697,178 | B1 | 7/2017 | Nichols et al. |
| 9,697,192 | B1 | 7/2017 | Estes et al. |
| 9,697,197 | B1 | 7/2017 | Birnbaum et al. |
| 9,697,492 | B1 | 7/2017 | Birnbaum et al. |
| 9,720,884 | B2 | 8/2017 | Birnbaum et al. |
| 9,720,899 | B1 | 8/2017 | Birnbaum et al. |
| 9,792,277 | B2 | 10/2017 | Srinivasan |
| 9,870,629 | B2 | 1/2018 | Cardno et al. |
| 9,946,711 | B2 | 4/2018 | Reiter et al. |
| 9,971,967 | B2 | 5/2018 | Bufe, III et al. |
| 9,977,773 | B1 | 5/2018 | Birnbaum et al. |
| 9,990,337 | B2 | 6/2018 | Birnbaum et al. |
| 10,019,512 | B2 | 7/2018 | Boyle et al. |
| 10,037,377 | B2 | 7/2018 | Boyle et al. |
| 10,095,692 | B2 | 10/2018 | Song et al. |
| 10,185,477 | B1 | 1/2019 | Paley et al. |
| 10,489,488 | B2 | 11/2019 | Birnbaum et al. |
| 10,565,308 | B2 | 2/2020 | Reiter |
| 10,572,606 | B1 | 2/2020 | Paley et al. |
| 10,585,983 | B1 | 3/2020 | Paley et al. |
| 10,657,201 | B1 | 5/2020 | Nichols et al. |
| 10,699,079 | B1 | 6/2020 | Paley et al. |
| 10,706,236 | B1 | 7/2020 | Platt et al. |
| 10,747,823 | B1 | 8/2020 | Birnbaum et al. |
| 10,755,042 | B2 | 8/2020 | Birnbaum et al. |
| 10,755,046 | B1 | 8/2020 | Lewis Meza et al. |
| 10,762,304 | B1 | 9/2020 | Paley et al. |
| 10,853,583 | B1 | 12/2020 | Platt et al. |
| 10,956,656 | B2 | 3/2021 | Birnbaum et al. |
| 10,963,649 | B1 | 3/2021 | Sippel et al. |
| 10,990,767 | B1 | 4/2021 | Smathers et al. |
| 11,003,866 | B1 | 5/2021 | Sippel et al. |
| 11,030,408 | B1 | 6/2021 | Meza et al. |
| 11,042,708 | B1 | 6/2021 | Pham et al. |
| 11,042,709 | B1 | 6/2021 | Pham et al. |
| 11,042,713 | B1 | 6/2021 | Platt et al. |
| 11,068,661 | B1 | 7/2021 | Nichols et al. |
| 11,144,838 | B1 | 10/2021 | Platt et al. |
| 11,170,038 | B1 | 11/2021 | Platt et al. |
| 11,182,556 | B1 | 11/2021 | Lewis Meza et al. |
| 11,188,588 | B1 | 11/2021 | Platt et al. |
| 2002/0046018 | A1 | 4/2002 | Marcu et al. |
| 2002/0083025 | A1 | 6/2002 | Robarts et al. |
| 2002/0099730 | A1 | 7/2002 | Brown et al. |
| 2002/0107721 | A1 | 8/2002 | Darwent et al. |
| 2003/0004706 | A1 | 1/2003 | Yale et al. |
| 2003/0061029 | A1 | 3/2003 | Shaket |
| 2003/0182102 | A1 | 9/2003 | Corston-Oliver et al. |
| 2003/0212543 | A1 | 11/2003 | Epstein et al. |
| 2003/0216905 | A1 | 11/2003 | Chelba et al. |
| 2004/0015342 | A1 | 1/2004 | Garst |
| 2004/0034520 | A1 | 2/2004 | Langkilde-Geary et al. |
| 2004/0083092 | A1 | 4/2004 | Valles |
| 2004/0138899 | A1 | 7/2004 | Birnbaum et al. |
| 2004/0174397 | A1 | 9/2004 | Cereghini et al. |
| 2004/0225651 | A1 | 11/2004 | Musgrove et al. |
| 2004/0255232 | A1 | 12/2004 | Hammond et al. |
| 2005/0027704 | A1 | 2/2005 | Hammond et al. |
| 2005/0028156 | A1 | 2/2005 | Hammond et al. |
| 2005/0033582 | A1 | 2/2005 | Gadd et al. |
| 2005/0049852 | A1 | 3/2005 | Chao |
| 2005/0125213 | A1 | 6/2005 | Chen et al. |
| 2005/0137854 | A1 | 6/2005 | Cancedda et al. |
| 2005/0273362 | A1 | 12/2005 | Harris et al. |
| 2006/0031182 | A1 | 2/2006 | Ryan et al. |
| 2006/0101335 | A1 | 5/2006 | Pisciottano |
| 2006/0181531 | A1 | 8/2006 | Goldschmidt |
| 2006/0218485 | A1 | 9/2006 | Blumenthal |
| 2006/0253431 | A1 | 11/2006 | Bobick et al. |
| 2006/0253783 | A1 * | 11/2006 | Vronay ............ G06F 40/186 715/730 |
| 2006/0271535 | A1 | 11/2006 | Hammond et al. |
| 2006/0277168 | A1 | 12/2006 | Hammond et al. |
| 2007/0132767 | A1 | 6/2007 | Wright et al. |
| 2007/0136657 | A1 | 6/2007 | Blumenthal et al. |

(56) References Cited

U.S. PATENT DOCUMENTS

| | | |
|---|---|---|
| 2007/0185846 A1 | 8/2007 | Budzik et al. |
| 2007/0185847 A1 | 8/2007 | Budzik et al. |
| 2007/0185861 A1 | 8/2007 | Budzik et al. |
| 2007/0185862 A1 | 8/2007 | Budzik et al. |
| 2007/0185863 A1 | 8/2007 | Budzik et al. |
| 2007/0185864 A1 | 8/2007 | Budzik et al. |
| 2007/0185865 A1 | 8/2007 | Budzik et al. |
| 2007/0250479 A1 | 10/2007 | Lunt et al. |
| 2007/0250826 A1 | 10/2007 | O'Brien |
| 2007/0294201 A1 | 12/2007 | Nelken et al. |
| 2008/0005677 A1 | 1/2008 | Thompson |
| 2008/0198156 A1 | 8/2008 | Jou et al. |
| 2008/0250070 A1 | 10/2008 | Abdulla et al. |
| 2008/0256066 A1 | 10/2008 | Zuckerman et al. |
| 2008/0304808 A1 | 12/2008 | Newell et al. |
| 2008/0306882 A1 | 12/2008 | Schiller |
| 2008/0313130 A1 | 12/2008 | Hammond et al. |
| 2009/0019013 A1 | 1/2009 | Tareen et al. |
| 2009/0030899 A1 | 1/2009 | Tareen et al. |
| 2009/0049041 A1 | 2/2009 | Tareen et al. |
| 2009/0083288 A1 | 3/2009 | LeDain et al. |
| 2009/0119095 A1 | 5/2009 | Beggelman et al. |
| 2009/0119584 A1 | 5/2009 | Herbst |
| 2009/0144608 A1 | 6/2009 | Oisel et al. |
| 2009/0175545 A1 | 7/2009 | Cancedda et al. |
| 2009/0248399 A1 | 10/2009 | Au |
| 2010/0146393 A1 | 6/2010 | Land et al. |
| 2010/0161541 A1 | 6/2010 | Covannon et al. |
| 2010/0185984 A1 | 7/2010 | Wright et al. |
| 2010/0241620 A1 | 9/2010 | Manister et al. |
| 2010/0325107 A1 | 12/2010 | Kenton et al. |
| 2011/0022941 A1 | 1/2011 | Osborne et al. |
| 2011/0044447 A1 | 2/2011 | Morris et al. |
| 2011/0077958 A1 | 3/2011 | Breitenstein et al. |
| 2011/0078105 A1 | 3/2011 | Wallace |
| 2011/0087486 A1 | 4/2011 | Schiller |
| 2011/0099184 A1 | 4/2011 | Symington |
| 2011/0113315 A1 | 5/2011 | Datha et al. |
| 2011/0113334 A1 | 5/2011 | Joy et al. |
| 2011/0213642 A1 | 9/2011 | Makar et al. |
| 2011/0246182 A1 | 10/2011 | Allen |
| 2011/0249953 A1 | 10/2011 | Suri et al. |
| 2011/0261049 A1 | 10/2011 | Cardno et al. |
| 2011/0288852 A1 | 11/2011 | Dymetman et al. |
| 2011/0295595 A1 | 12/2011 | Cao et al. |
| 2011/0295903 A1 | 12/2011 | Chen |
| 2011/0311144 A1 | 12/2011 | Tardif |
| 2011/0314381 A1 | 12/2011 | Fuller et al. |
| 2012/0011428 A1 | 1/2012 | Chisholm |
| 2012/0041903 A1 | 2/2012 | Beilby et al. |
| 2012/0069131 A1 | 3/2012 | Abelow |
| 2012/0109637 A1 | 5/2012 | Merugu et al. |
| 2012/0143849 A1 | 6/2012 | Wong et al. |
| 2012/0158850 A1 | 6/2012 | Harrison et al. |
| 2012/0291007 A1 | 11/2012 | Bagheri et al. |
| 2012/0310699 A1 | 12/2012 | McKenna et al. |
| 2013/0041677 A1 | 2/2013 | Nusimow et al. |
| 2013/0091031 A1 | 4/2013 | Baran et al. |
| 2013/0096947 A1 | 4/2013 | Shah et al. |
| 2013/0144605 A1* | 6/2013 | Brager ............ G06F 40/40 704/9 |
| 2013/0144606 A1 | 6/2013 | Birnbaum et al. |
| 2013/0145242 A1 | 6/2013 | Birnbaum et al. |
| 2013/0174026 A1 | 7/2013 | Locke |
| 2013/0187926 A1 | 7/2013 | Silverstein et al. |
| 2013/0211855 A1 | 8/2013 | Eberle et al. |
| 2013/0246934 A1 | 9/2013 | Wade et al. |
| 2013/0262092 A1 | 10/2013 | Wasick |
| 2013/0268534 A1 | 10/2013 | Mathew et al. |
| 2013/0304507 A1 | 11/2013 | Dail et al. |
| 2013/0316834 A1 | 11/2013 | Vogel et al. |
| 2014/0006012 A1 | 1/2014 | Zhou et al. |
| 2014/0062712 A1 | 3/2014 | Reiter |
| 2014/0075004 A1 | 3/2014 | Van Dusen et al. |
| 2014/0129942 A1 | 5/2014 | Rathod |
| 2014/0134590 A1 | 5/2014 | Hiscock Jr. |
| 2014/0149107 A1 | 5/2014 | Schilder |
| 2014/0163962 A1 | 6/2014 | Castelli et al. |
| 2014/0200878 A1 | 7/2014 | Mylonakis et al. |
| 2014/0208215 A1 | 7/2014 | Deshpande |
| 2014/0314225 A1 | 10/2014 | Riahi et al. |
| 2014/0351281 A1 | 11/2014 | Tunstall-Pedoe |
| 2014/0356833 A1 | 12/2014 | Sabczynski et al. |
| 2014/0372850 A1 | 12/2014 | Campbell et al. |
| 2014/0375466 A1 | 12/2014 | Reiter |
| 2015/0049951 A1 | 2/2015 | Chaturvedi et al. |
| 2015/0078232 A1 | 3/2015 | Djinki et al. |
| 2015/0088808 A1 | 3/2015 | Tyagi et al. |
| 2015/0134694 A1 | 5/2015 | Burke et al. |
| 2015/0142704 A1 | 5/2015 | London |
| 2015/0161997 A1 | 6/2015 | Wetsel et al. |
| 2015/0169548 A1 | 6/2015 | Reiter |
| 2015/0178386 A1 | 6/2015 | Oberkampf et al. |
| 2015/0186504 A1 | 7/2015 | Gorman et al. |
| 2015/0199339 A1 | 7/2015 | Mirkin et al. |
| 2015/0227508 A1 | 8/2015 | Howald et al. |
| 2015/0227588 A1 | 8/2015 | Shapira et al. |
| 2015/0242384 A1 | 8/2015 | Reiter |
| 2015/0261745 A1 | 9/2015 | Song et al. |
| 2015/0268930 A1 | 9/2015 | Lee et al. |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0325000 A1 | 11/2015 | Sripada |
| 2015/0347391 A1 | 12/2015 | Chen et al. |
| 2015/0347400 A1 | 12/2015 | Sripada |
| 2015/0363364 A1 | 12/2015 | Sripada |
| 2016/0019200 A1 | 1/2016 | Allen |
| 2016/0026253 A1 | 1/2016 | Bradski et al. |
| 2016/0086084 A1 | 3/2016 | Nichols et al. |
| 2016/0132489 A1 | 5/2016 | Reiter |
| 2016/0140090 A1 | 5/2016 | Dale et al. |
| 2016/0162445 A1 | 6/2016 | Birnbaum et al. |
| 2016/0217133 A1 | 7/2016 | Reiter et al. |
| 2016/0314121 A1 | 10/2016 | Arroyo et al. |
| 2016/0328365 A1 | 11/2016 | Birnbaum et al. |
| 2017/0060857 A1 | 3/2017 | Imbruce et al. |
| 2017/0061093 A1 | 3/2017 | Amarasingham et al. |
| 2017/0140405 A1 | 5/2017 | Gottemukkala et al. |
| 2017/0344518 A1 | 11/2017 | Birnbaum et al. |
| 2018/0285324 A1 | 10/2018 | Birnbaum et al. |
| 2020/0089735 A1 | 3/2020 | Birnbaum et al. |
| 2021/0192132 A1 | 6/2021 | Birnbaum et al. |
| 2021/0192144 A1 | 6/2021 | Paley et al. |

FOREIGN PATENT DOCUMENTS

| | | |
|---|---|---|
| WO | 2014035400 A1 | 3/2014 |
| WO | 2014035402 A1 | 3/2014 |
| WO | 2014035403 A1 | 3/2014 |
| WO | 2014035406 A1 | 3/2014 |
| WO | 2014035407 A1 | 3/2014 |
| WO | 2014035447 A1 | 3/2014 |
| WO | 2014070197 A1 | 5/2014 |
| WO | 2014076524 A1 | 5/2014 |
| WO | 2014076525 A1 | 5/2014 |
| WO | 2014102568 A1 | 7/2014 |
| WO | 2014102569 A1 | 7/2014 |
| WO | 2014111753 A1 | 7/2014 |
| WO | 2015028844 A1 | 3/2015 |
| WO | 2015159133 A1 | 10/2015 |

OTHER PUBLICATIONS

Allen et al., "StatsMonkey: A Data-Driven Sports Narrative Writer", Computational Models of Narrative: Papers from the AAAI Fall Symposium, Nov. 2010, 2 pages.

Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.

(56) References Cited

OTHER PUBLICATIONS

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.
Asset Economics, Inc. (Feb. 11, 2011).
Bailey, P. (1999). Searching for Storiness: Story-Generation from a Reader's Perspective. AAAI Technical Report FS-99-01.
Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.
Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.
Boyd, S. (1998). TREND: a system for generating intelligent descriptions of time series data. Paper presented at Proceedings of the IEEE international conference on intelligent processing systems (ICIPS-1998).
Character Writer Version 3.1, Typing Chimp Software LLC, 2012, screenshots from working program, pp. 1-19.
Dehn, N. (1981). Story generation after TALE-SPIN. In Proceedings of the Seventh International Joint Conference on Artificial Intelligence. (Vancouver, Canada).
Dramatica Pro version 4, Write Brothers, 1993-2006, user manual.
Gatt, A., and Portet, F. (2009). Text content and task performance in the evaluation of a Natural Language Generation System. Proceedings of the Conference on Recent Advances in Natural Language Processing (RANLP-09).
Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.
Glahn, H. (1970). Computer-produced worded forecasts. Bulletin of the American Meteorological Society, 51(12), 1126-1131.
Goldberg, E., Driedger, N., & Kittredge, R. (1994). Using Natural-Language Processing to Produce Weather Forecasts. IEEE Expert, 9 (2), 45.
Hargood, C., Millard, D. and Weal, M. (2009) Exploring the Importance of Themes in Narrative Systems.
Hargood, C., Millard, D. and Weal, M. (2009). Investigating a Thematic Approach to Narrative Generation, 2009.
Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.
Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.
Kittredge, R., and Lavoie, B. (1998). MeteoCogent: A Knowledge-Based Tool For Generating Weather Forecast Texts. In Proceedings of the American Meteorological Society Al Conference (AMS-98), Phoenix, Arizona.
Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.
Kukich, K. (1983). Design of a Knowledge-Based Report Generator. Proceedings of the 21st Conference of the Association for Computational Linguistics, Cambridge, MA, pp. 145-150.
Kukich, K. (1983). Knowledge-Based Report Generation: A Technique for Automatically Generating Natural Language Reports from Databases. Paper presented at Proceedings of the Sixth International ACM SIGIR Conference, Washington, DC.
McKeown, K., Kukich, K., & Shaw, J. (1994). Practical issues in automatic documentation generation. 4th Conference on Applied Natural Language Processing, Stuttgart, Germany, pp. 7-14.
Meehan, James R., TALE-SPIN. (1977). An Interactive Program that Writes Stories. In Proceedings of the Fifth International Joint Conference on Artificial Intelligence.
Memorandum Opinion and Order for *O2 Media, LLC* v. *Narrative Science Inc.*, Case 1:15-cv-05129 (N.D. IL), Feb. 25, 2016, 25 pages (invalidating claims of U.S. Pat. No. 7,856,390, U.S. Pat. No. 8,494,944, and U.S. Pat. No. 8,676,691 owned by O2 Media, LLC.
Moncur, W., and Reiter, E. (2007). How Much to Tell? Disseminating Affective Information across a Social Network. Proceedings of Second International Workshop on Personalisation for e-Health.
Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.
Movie Magic Screenwriter, Writer Brothers, 2009, user manual.
Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.
Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.
Prosecution History for U.S. Appl. No. 13/186,308, now U.S. Pat. No. 8,775,161, filed Jul. 19, 2011.
Prosecution History for U.S. Appl. No. 13/186,329, now U.S. Pat. No. 8,892,417, filed Jul. 19, 2011.
Prosecution History for U.S. Appl. No. 13/186,337, now U.S. Pat. No. 8,886,520, filed Jul. 19, 2011.
Prosecution History for U.S. Appl. No. 13/186,346, filed Jul. 19, 2011.
Prosecution History for U.S. Appl. No. 13/464,635, filed May 4, 2012.
Prosecution History for U.S. Appl. No. 13/464,675, filed May 4, 2012.
Reiter et al., "Building Applied Natural Generation Systems", Cambridge University Press, 1995, pp. 1-32.
Reiter, E. (2007). An architecture for Data-To-Text systems. In: Busemann, Stephan (Ed.), Proceedings of the 11th European Workshop on Natural Language Generation, pp. 97-104.
Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Reiter, E., Sripada, S., Hunter, J., Yu, J., and Davy, I. (2005). Choosing words in computer-generated weather forecasts. Artificial Intelligence, 167:137-169.
Riedl et al., "Narrative Planning: Balancing Plot and Character", Journal of Artificial Intelligence Research, 2010, pp. 217-268, vol. 39.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Rui, Y., Gupta, A., and Acero, A. 2000. Automatically extracting highlights for TV Baseball programs. In Proceedings ot the eighth ACM international conference on Multimedia. (Marina del Rey, California, United States). ACM Press, New York, NY 105-115.
Sripada, S., Reiter, E., and Davy, I. (2003). SumTime-Mousam: Configurable Marine Weather Forecast Generator. Expert Update 6(3):4-10.
Storyview, Screenplay Systems, 2000, user manual.
Theune, M., Klabbers, E., Odijk, J., dePijper, J., and Krahmer, E. (2001) "From Data to Speech: A General Approach", Natural Language Engineering 7(1): 47-86.
Thomas, K., and Sripada, S. (2007). Atlas.txt: Linking Georeferenced Data to Text for NLG. Paper presented at Proceedings of the 2007 European Natural Language Generation Workshop (ENLG07).

(56) References Cited

OTHER PUBLICATIONS

Thomas, K., and Sripada, S. (2008). What's in a message? Interpreting Geo-referenced Data for the Visually-impaired. Proceedings of the Int. conference on NLG.

Thomas, K., Sumegi, L., Ferres, L., and Sripada, S. (2008). Enabling Access to Geo-referenced Information: Atlas.txt. Proceedings of the Cross-disciplinary Conference on Web Accessibility.

Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.

Yu, J., Reiter, E., Hunter, J., and Mellish, C. (2007). Choosing the content of textual summaries of large time-series data sets. Natural Language Engineering, 13:25-49.

Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).

Riedl et al., "From Linear Story Generation to Branching Story Graphs", IEFF Computer Graphics and Applications, 2006, pp. 23-31.

Prosecution History of U.S. Appl. No. 14/211,444, now U.S. Pat. No. 10,185,477, filed Mar. 14, 2014.

Mack et al., "A Framework for Metrics in Large Complex Systems", IEEE Aerospace Conference Proceedings, 2004, pp. 3217-3228, vol. 5, doi: 10 1109/AERO .2004.1368127.

Segel et al., "Narrative Visualization: Telling Stories with Data", Stanford University, Oct. 2010, 10 pgs.

\* cited by examiner

Version control (undo/redo):

© Narrative Science 2013

FIGURE 9 (cont'd)

Version control (undo/redo):

© Narrative Science 2013

| | | | | |
|---|---|---|---|---|
| MultipleMarriages | | false | 0.2 | |
|     MultipleMarriagesNoChildren | | false | 106.3 | |
|     MultipleMarriagesWithChildren | | false | 106.3 | |
| Religion | | true | 0.1 | |
|     Excommunication | | false | 30.2 | |
| Residence | | true | 0.1 | |
|     BaselineResidence | | true | 73.2 | |
|     LongResidence | | true | 0.2 | |
|         LongResidenceCity | | false | 75.2 | |
|         LongResidenceCounty | | false | 75.8 | |
|         LongResidenceState | | false | 75.6 | |
|     Migration | | true | 0.2 | |
|         LivedInMultipleCountries | | false | 90.3 | |
|         MoreThanTwoMoves | | false | 0 | |
|         MoreThanTwoMovesSameCity | | false | 0 | |
|         MoreThanTwoMovesSameCo... | | false | 0 | |
|         MoreThanTwoMovesSameState | | false | 0 | |
|         MoveToDiffState | | false | 76.3 | |
|         MoveToUS | | false | 89.3 | |
|         MultipleMoves | | false | 77.3 | |
|         MultipleMovesToDiffState | | false | 78.3 | |
|         OneMove | | false | 0 | |
|         OneMoveSameCity | | false | 0 | |
|         OneMoveSameCounty | | false | 0 | |
|         OneMoveSameState | | false | 0 | |
|         TwoMoves | | false | 0 | |
|         TwoMovesSameCity | | false | 0 | |
|         TwoMovesSameCounty | | false | 0 | |
|         TwoMovesSameState | | false | 0 | |
|         TwoMovesToDiffState | | false | 77.3 | |
| Household | | false | 0.2 | |
|     BaselineHousehold | | false | 74.3 | |
|     SingleFamily | | false | 0 | |

FIGURE 12 (cont'd)

| | | | | |
|---|---|---|---|---|
| OneMoveSameState | false | 0 | | |
| TwoMovesSameState | false | 0 | | |
| Household | false | 0.2 | ● | |
| BaselineMilitary | false | 85.2 | | |
| MultipleMarriagesNoChildren | false | 105.3 | | |
| BaselineHousehold | false | 74.3 | | |
| LongResidenceState | false | 75.6 | | |
| TwoMovesSameCity | false | 0 | | |
| SingleFamily | false | 0 | | |
| MoreThanTwoMoves | false | 0 | | |
| TwoMoves | false | 0 | | |
| LivedInMultipleCountries | false | 90.3 | | |
| MarriageChildren | false | 98.2 | | |
| MoreThanTwoMovesSameState | false | 0 | | |
| MarriedTwice | false | 8.2 | ● | |
| Children | false | 0.2 | ● | |
| MoreThanTwoMovesSameCity | false | 0 | | |
| HasMultipleFamilies | false | 96.2 | | |
| MoveToUS | false | 89.3 | | |
| MoreThanTwoMovesSameCounty | false | 0 | | |
| MultipleMarriages | false | 0.2 | ● | |
| TwoChildren | false | 81.3 | | |
| OneChild | false | 90.3 | | |
| MoreThanTwoChildren | false | 92.3 | | |
| MultipleMovesToDiffState | false | 78.3 | | |
| OneMoveSameCounty | false | 0 | | |
| TwoMovesSameCounty | false | 0 | | |
| TwoMovesToDiffState | false | 77.3 | | |
| MoveToDiffState | false | 76.3 | | |
| MultipleMoves | false | 77.3 | | |
| FatherDied | false | 83.3 | | |
| MotherDied | false | 83.3 | | |
| BothParentsDied | false | 84.3 | | |

FIGURE 13 (cont'd)

| | | | |
|---|---|---|---|
| MarriedTwiceChildrenSecondMarriage | false | 95.3 | |
| MarriedTwiceNoChildren | false | 93.3 | |
| MarriedTwiceChildrenFirstMarriage | false | 94.3 | |
| MarriedTwiceChildrenBothMarriages | false | 96.3 | |
| Excommunication | false | 30.2 | |

© Narrative Science 2013 referenced directly by:
Life                                              type: contentFamily
Marriage                                          type: contentFamily
Married With Children_copy                        type: contentFamily
Second Life                                       type: contentFamily comments:

edited by: aaaaaa@narrativescience.com @ 12:30pm on 3/15/2013

Version control (undo/redo):

© Narrative Science 2013

Version control (undo/redo):

© Narrative Science 2013

FIGURE 23

METHOD AND SYSTEM FOR CONFIGURING AUTOMATIC GENERATION OF NARRATIVES FROM DATA

CROSS-REFERENCE AND PRIORITY CLAIM TO RELATED APPLICATIONS

This patent application is a continuation of U.S. patent application Ser. No. 14/211,444, filed Mar. 14, 2014, entitled "Method and System for Configuring Automatic Generation of Narratives from Data", now U.S. Pat. No. 10,185,477, which claims priority to U.S. provisional patent application Ser. No. 61/799,328, filed Mar. 15, 2013, entitled "Method and System for Configuring Automatic Generation of Narratives from Data", the entire disclosures of each of which are incorporated herein by reference.

COPYRIGHT NOTICE

A portion of the disclosure of this patent document contains material which is subject to copyright protection. the copyright owner has no objection to the facsimile reproduction by anyone of the patent document or the patent disclosure, as it appears in the Patent and Trademark Office patent file or records, but otherwise reserves all copyright rights whatsoever.

INTRODUCTION

A method or system for automatically generating narratives from data must be configured appropriately in order to, on the one hand, generate narratives relevant to the needs of a particular audience, and, on the other, to ingest, organize, and process the available data for this purpose. We have previously developed methods and systems for automatically generating narratives from data; and we have also developed methods and systems for devising and implementing configurable platforms capable of carrying out and implementing such methods and systems in order to generate relevant narratives based on appropriate data as described above.

Here, we describe a method and system for configuring such a platform. The configuration process itself is carried out, primarily, by people skilled in the development of editorial content, as opposed to technology developers. A method or system aimed at supporting this process must comprise several elements: First, a delineation of the information that must be provided by these users, comprising the necessary configuration, about the available data, derivations describing and implementing important analyses based on that data, appropriate conclusions and interpretations based on those data and analyses, relevant narrative forms, and appropriate words and phrases for conveying selected data, derivations, and interpretations in linguistic sequences and structures to readers, in order to generate appropriate narratives. Second, an interface and interaction model aimed at eliciting and describing this configuration information, comprising methods and systems for supporting users in determining and notating the necessary information. And third, a method and system for enabling users to quickly and effectively determine whether the configurations they have specified are leading to the desired outcomes with regard to the generation of appropriate narratives and/or utilization of the available data, and if not, why, in order to effectively and efficiently iterate on and improve these configurations.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 1 illustrates an interface showing high-level Outlines that have been specified in the current configuration according to an exemplary embodiment;

FIG. 2 illustrates a specific story Outline that has been selected for inspection or further development, and its constituent Content Blocks according to an exemplary embodiment;

FIG. 15 illustrates another set of Content Blocks in expanded form according to an exemplary embodiment;

FIG. 16 illustrates a Blueprint Set including a series of alternative ways of expressing the facts relevant to a given Angle in a given Content Block according to an exemplary embodiment;

FIG. 21 illustrates the initial screen seen by a user upon returning to work on a configuration in progress according to an exemplary embodiment;

FIG. 22 illustrates a configuration tool loaded with a number of different sets of sample data according to an exemplary embodiment;

FIG. 23 illustrates a portion of a Model with sample data loaded into it according to an exemplary embodiment;

DETAILED DESCRIPTION

1. Information Comprising The Necessary Configuration

Figure 3:
FIG. 3 illustrates an Outline in an "expanded" view, in which all of its constituent Content Blocks, associated Angles, etc., may be inspected or selected for further development according to an exemplary embodiment.
Figure 3:

In the configurable platform for generating narratives from data that we have developed, the configuration information that must be supplied in order to generate appropriate narratives from relevant information is as follows; these elements and their function are described more extensively in previous patents and disclosures (see U.S. Pat. Nos. 8,374,848, 8,355,903, and 8,630,844, and U.S. patent applications Ser. Nos. 13/464,635, 13/464,675, 13/186,308, 13/186,329, 13/186,337, and 13/186,346, the entire disclosures of each of which are incorporated herein by reference):

i. Models: These comprise appropriate structures for organizing and accessing the data about specific entities and events in generating relevant narratives. For example, as described in the above-referenced and incorporated U.S. Pat. Nos. 8,374,848 and 8,355,903, the data organized by the models will typically comprise structured numeric and/or quasi-numeric data, i.e., the data will fall into particular fields and/or categories and will be known to relate to specific events, situations, entities, etc., or aggregations thereof.

ii. Derivations: These comprise relevant aggregations and other functions the values of which are determined by the data organized by and contained in the Models.

iii. Angles and Angle Families: Angles comprise larger thematic structures that aggregate, connect, and characterize data in understandable and useful terms. Angle Families are sets of related Angles that share common conditions and attributes.

iv. Content Blocks: These comprise the rhetorical structures associated with a given story type and include:

a. Content Nodes: Sequence of related Content Blocks, comprising the hierarchical description of a narrative.

b. Outlines: Types of Content Nodes representing the high-level structure of a story.

c. Basic Content Blocks: Structures specifying the relevant entities (Model components), Angles/Angle Families (interpretations), and linguistic forms (in the form of Blueprint Sets, Blueprints, and Phraseblocks), which constitute portions of a narrative.

d. Blueprint Sets, Blueprints, and Phraseblocks: The structures representing actual words and phrases used to convey information relating to particular angles or derived features in the context of particular content blocks.

2. Interfaces For Interaction In Support Of Configuration

To support users in specifying the necessary information described above in configuring a mechanism such as the ones described in the above-referenced and incorporated patents and patent applications for generating stories from data in order to create stories of a desired form from specified types of available data, we have developed a graphical user interface tool that elicits this configuration information from users in a well-structured manner, as well as supporting them in supplying this information. The rest of this section is devoted to depicting and describing screens that implement important aspects of this interface and process. It should be understood that varied and distinct designs capable of supporting users in supplying the necessary configuration information in functionally equivalent ways could be developed and implemented.

This interface tool and associated interaction model do not constrain users (editorial experts) to supplying the necessary configuration information in a fixed order. Rather, users can navigate from one screen to another, supplying this information in whatever sequence makes sense to them. Many users will utilize the interface in a "top down" manner, starting by specifying the high-level Outline and its constituent Content Nodes and Content Blocks, then proceeding to Angles and Angle Families, Derivations, Blueprint Sets, etc. Others will proceed in a more "bottom up" fashion, starting from Models, and then specifying Derivations, Angles and Angle Families, and various Content Blocks, before finally composing these into a unified Outline.

As users develop and refine the necessary configurations using this interface, the information they provide is stored in a database. The interface lets users see which portions of the necessary configuration have been completed, and which remain to be developed; and allows them to test portions of the configuration under development in order to assess its suitability and correctness. When the user is satisfied with the configuration information, it is transferred to the configurable platform, which then generates narratives at scale (i.e., potentially large numbers of narratives, each based on different input data)as specified by the configuration.

In most of the following examples, the configurations being depicted as under development are aimed at describing biographical information associated with an individual. It should be clear that different narratives with different aims, and utilizing different kinds of data, would entail the development of different configurations using this interface and interaction model, and that the specifics provided here are for illustrative purposes only.

Figure 1:
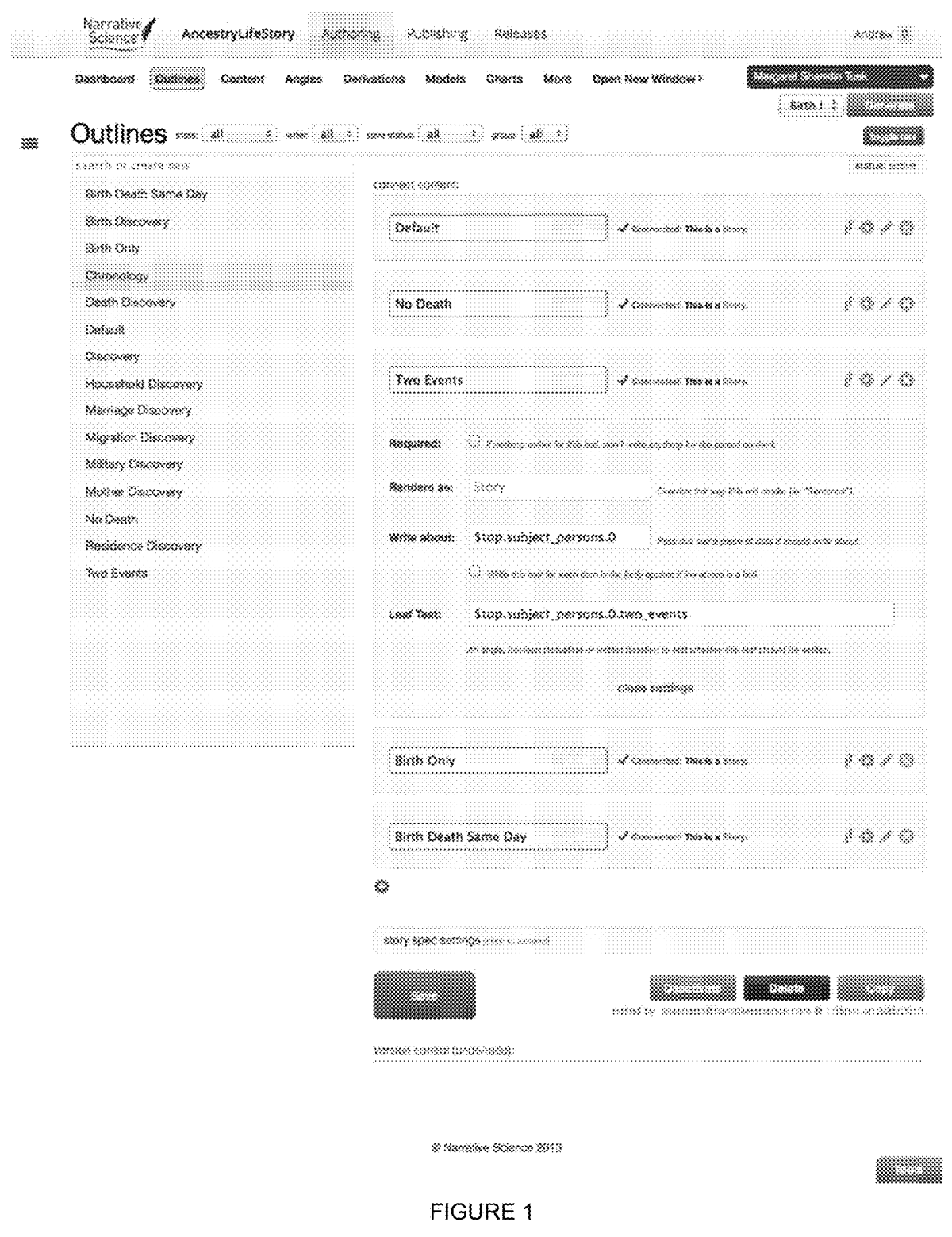

FIG. 1 depicts the interface showing the high-level Outlines that have been specified so far in the current configuration. The Outline to be inspected and/or worked on can be selected from that navigation list provided on the left side. The Outline that has been selected ("Chronology") is disjunctive, and comprises other Outlines that specify different narratives to be generated based on the nature of the data at hand. These constituent Outlines can be expanded to show further detail of their configurations, as depicted here with the Outline "Two Events". This Outline has a focus—the entity that it is "about"—as provided in the "Write about"

field, which has been configured to refer to an element of the Model that organizes and provides access to the data from which the narrative will be generated. The Outline also specifies a test, which is a Boolean value supplied by a Derivation, that is used to determine whether the Outline is applicable to the data at hand.

This figure also depicts some general attributes of the interface and interaction model. The navigation bar at the very top shows that the system is currently in "Authoring" (as opposed to "Publishing") mode, since the configuration is still under development. The navigation bar just below that shows the different kinds of information that must be supplied in a configuration as described earlier, e.g., Outlines, Content Blocks, Angles, etc., which enable the user (editorial expert) to select which aspect of the configuration to inspect and/or refine.

Figure 2:
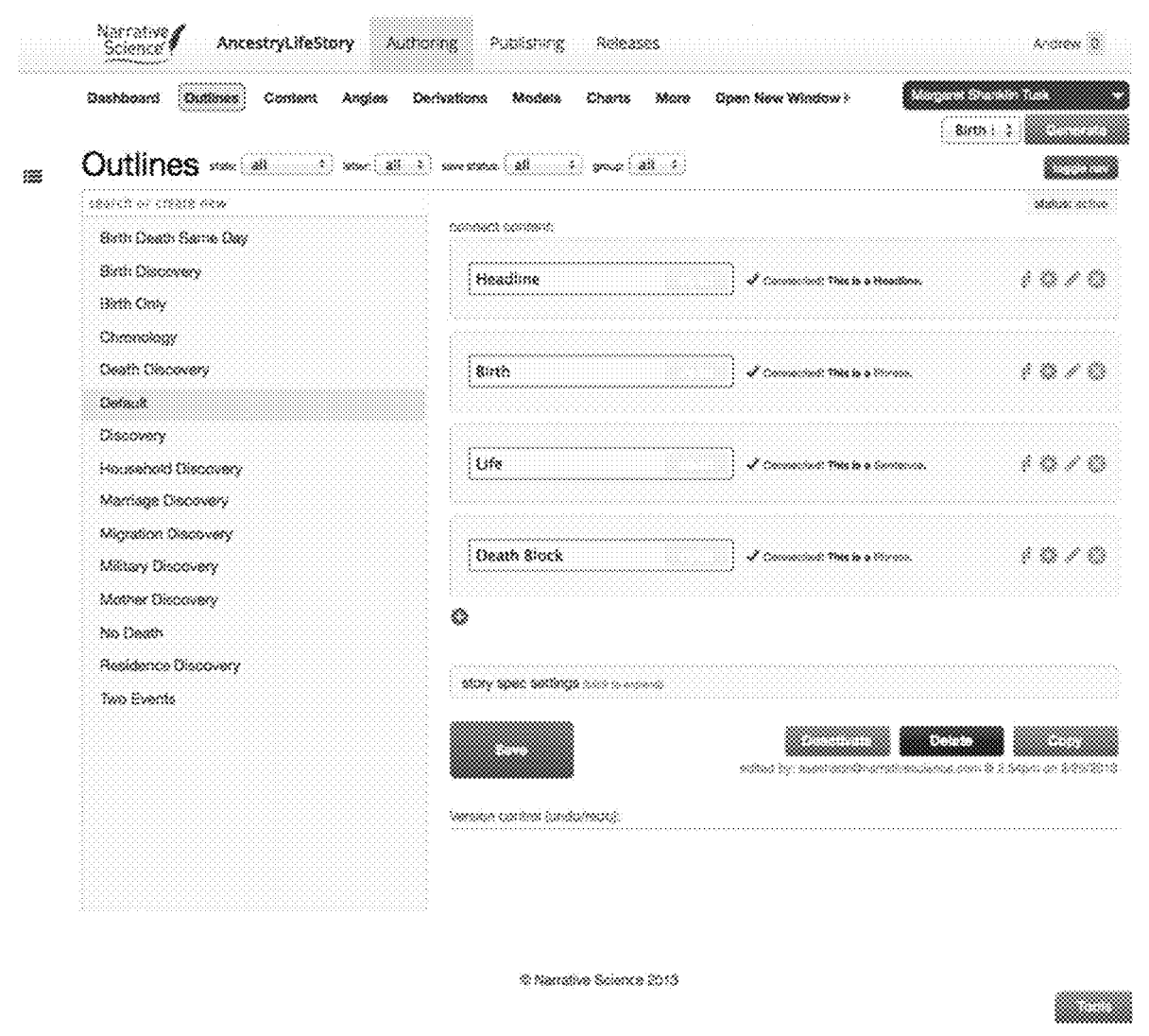

FIG. 2 depicts a specific story Outline ("Default") that has been selected for inspection and/or further development, and its constituent Content Blocks. These Content Blocks in turn may be selected and edited, or new Content Blocks may be added to this Outline.

FIG. 3 depicts this same Outline in an "expanded" view, in which all of its constituent Content Blocks, associated Angles, etc., may be inspected and/or selected for further development in relation to the Outline as a whole. The indentation structure of this view reflects the hierarchical structure of the Outline.

Figure 4:
FIG. 4 illustrates types of Models available for utilization in configuring and ultimately generating a story according to an exemplary embodiment.
Figure 4:
Figure 4:
Figure 4:
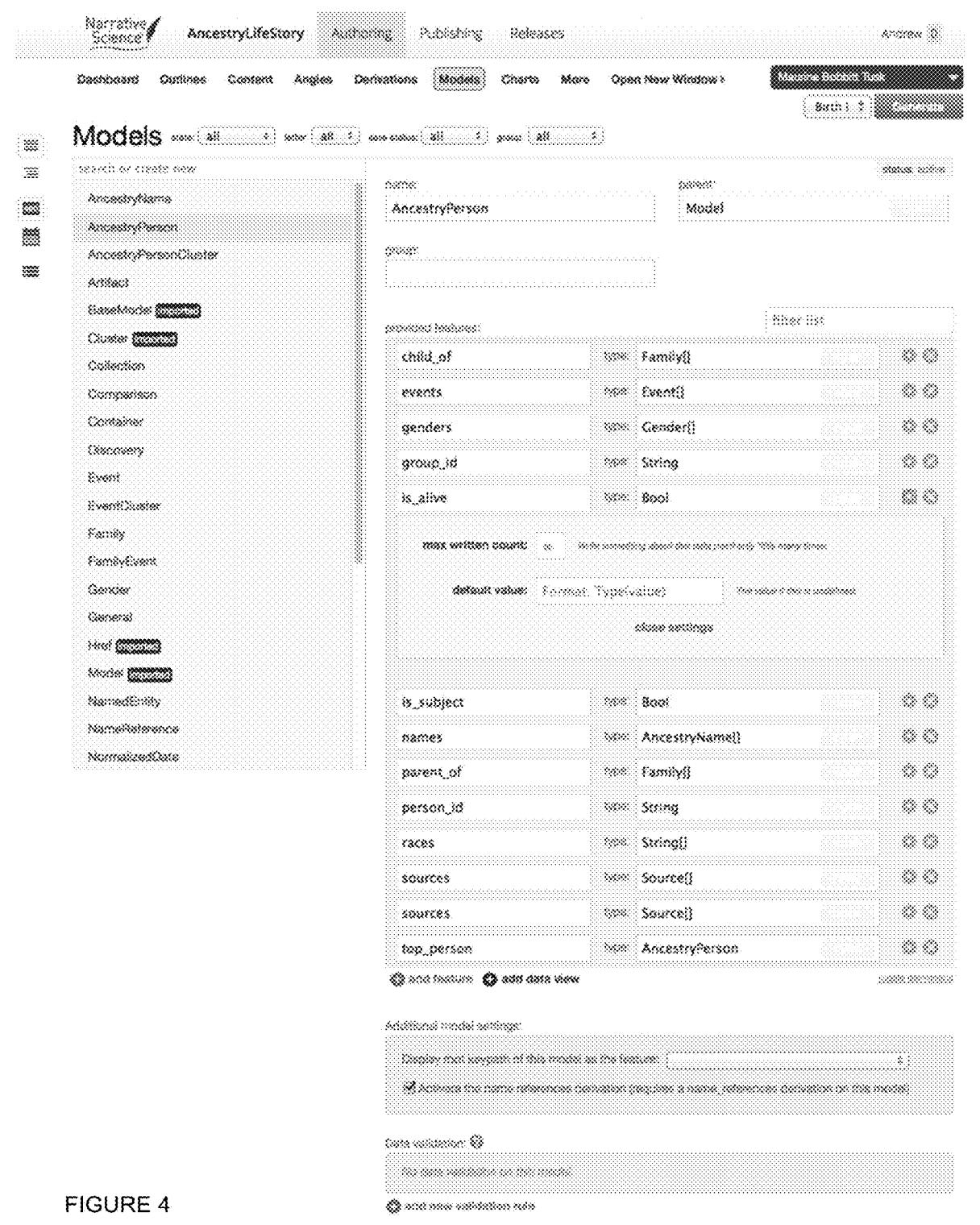

FIG. 4 depicts the types of Models (structured data elements) available for utilization in configuring and ultimately generating a story. The user may also create new Model types, with specified components as needed or convenient to further refine the configuration under development. In actual story generation, these Models must be supplied with actual data corresponding to their components, in a mapping and data transfer process that lies outside the scope of this invention.

Figure 5:
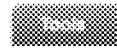
FIG. 5 illustrates a Derivation having been selected for inspection or refinement according to an exemplary embodiment.

FIG. 5 depicts a Derivation having been selected for inspection and/or refinement. During configuration, the Derivation is given a name, a type of result (in this case Boolean), the types of data to which it is applied, the components of the Model to which it is applied, and then finally a description of how it is to be computed in terms of a special-purpose specification language.

Figure 6:
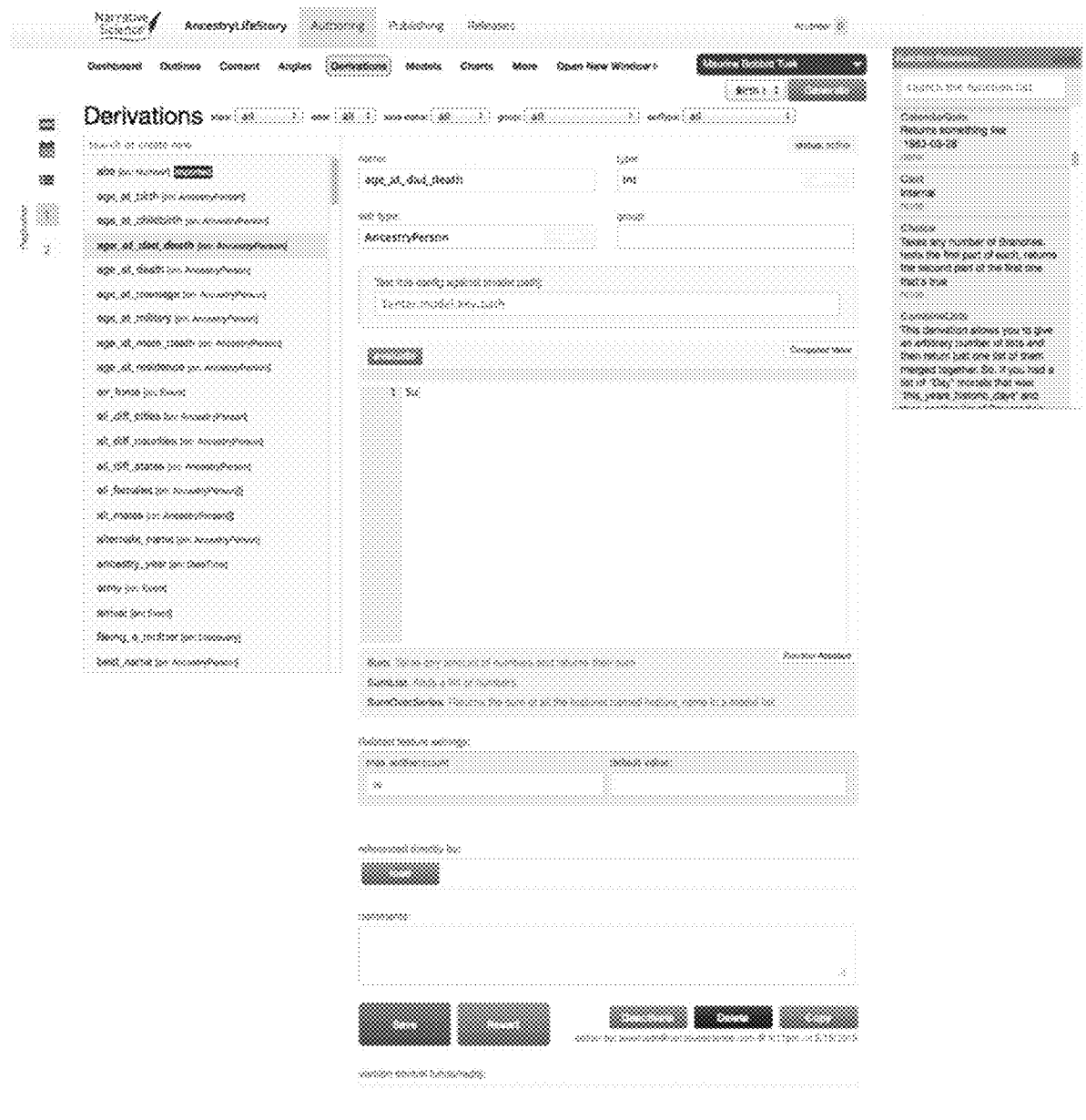
FIG. 6 illustrates operations provided by a specification language available to the user through a searchable reference tool according to an exemplary embodiment.
Figure 7:
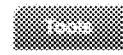
FIG. 7 illustrates the interface supplying suggestions about specific entities in the current configuration to which a user might be referring as he or she enters the names of specific entities according to an exemplary embodiment.
Figure 8:
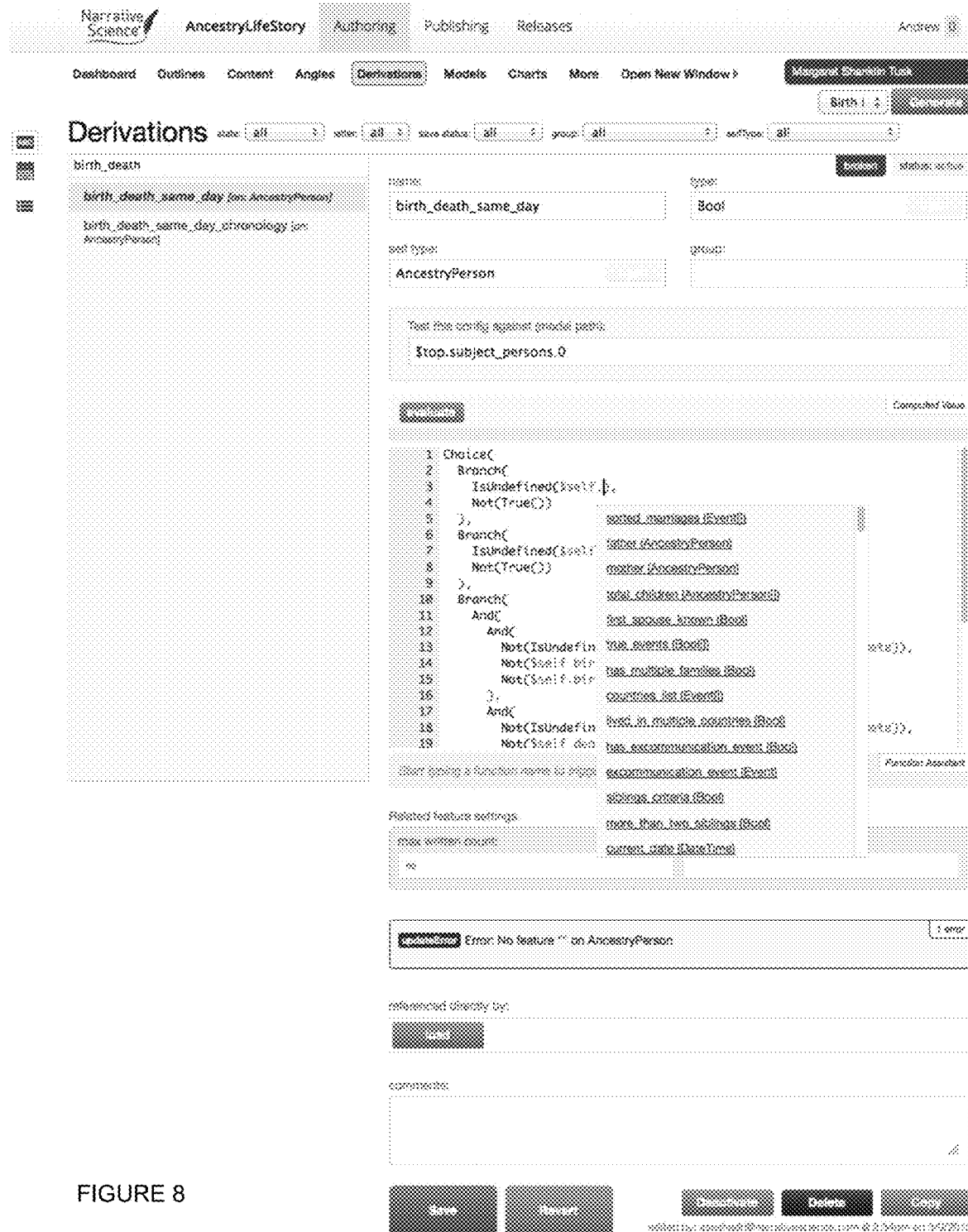
FIG. 8 illustrates an error message displayed when the user supplies a name that doesn't refer to an existing entity in the configuration according to an exemplary embodiment.
Figure 8:

FIGS. 6 through 8 illustrate the kinds of help available to users as they utilize the interface to develop an appropriate configuration. As depicted in FIG. 6, the operations provided by this specification language are available to the user through a searchable reference tool. Additionally, as a user enters operation names, the available operations to which he or she might be referring are also suggested on the basis of what has been entered so far.

As depicted in FIG. 7, the interface also supplies suggestions about the specific entities (e.g., Model components, Derivations, Angles, etc.) in the current configuration to which a user might be referring as he or she enters the names of these specific entities. As depicted in FIG. 8, when the user supplies a name that doesn't refer to an existing entity in the configuration, an error message is immediately displayed.

Figure 9:
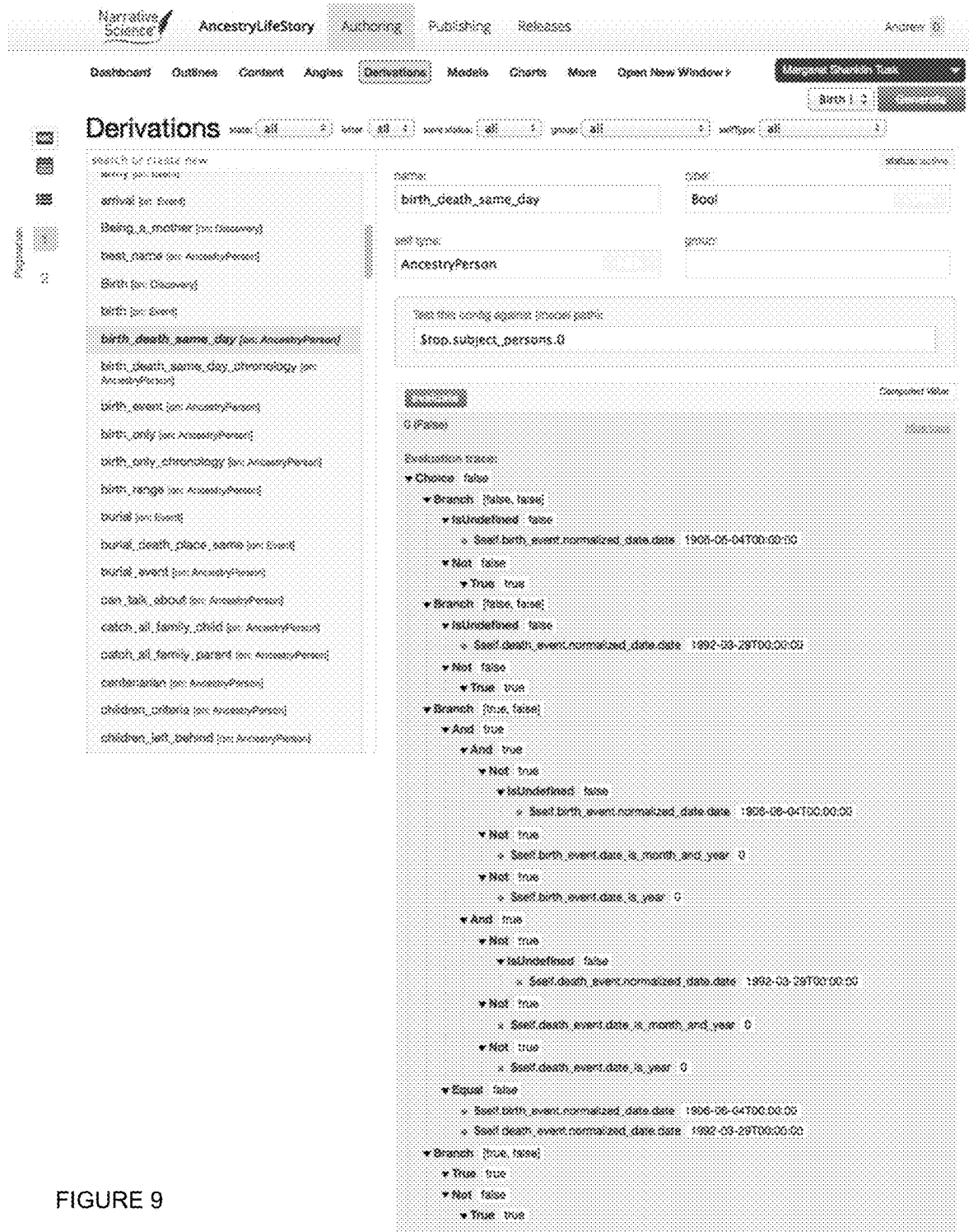
FIG. 9 illustrates the result of an evaluation according to an exemplary embodiment.

As a user is developing the configuration of a Derivation, he or she may test it using the "Evaluate" button displayed. As depicted in FIG. 9, the result of this evaluation is provided along with a trace of how each part of the Derivation's specification performed. (This capacity to provide immediate feedback on the operation of partial or complete configurations is a critical aspect of the system and method for configuration described here, and will be further elaborated below.)

Figure 10:
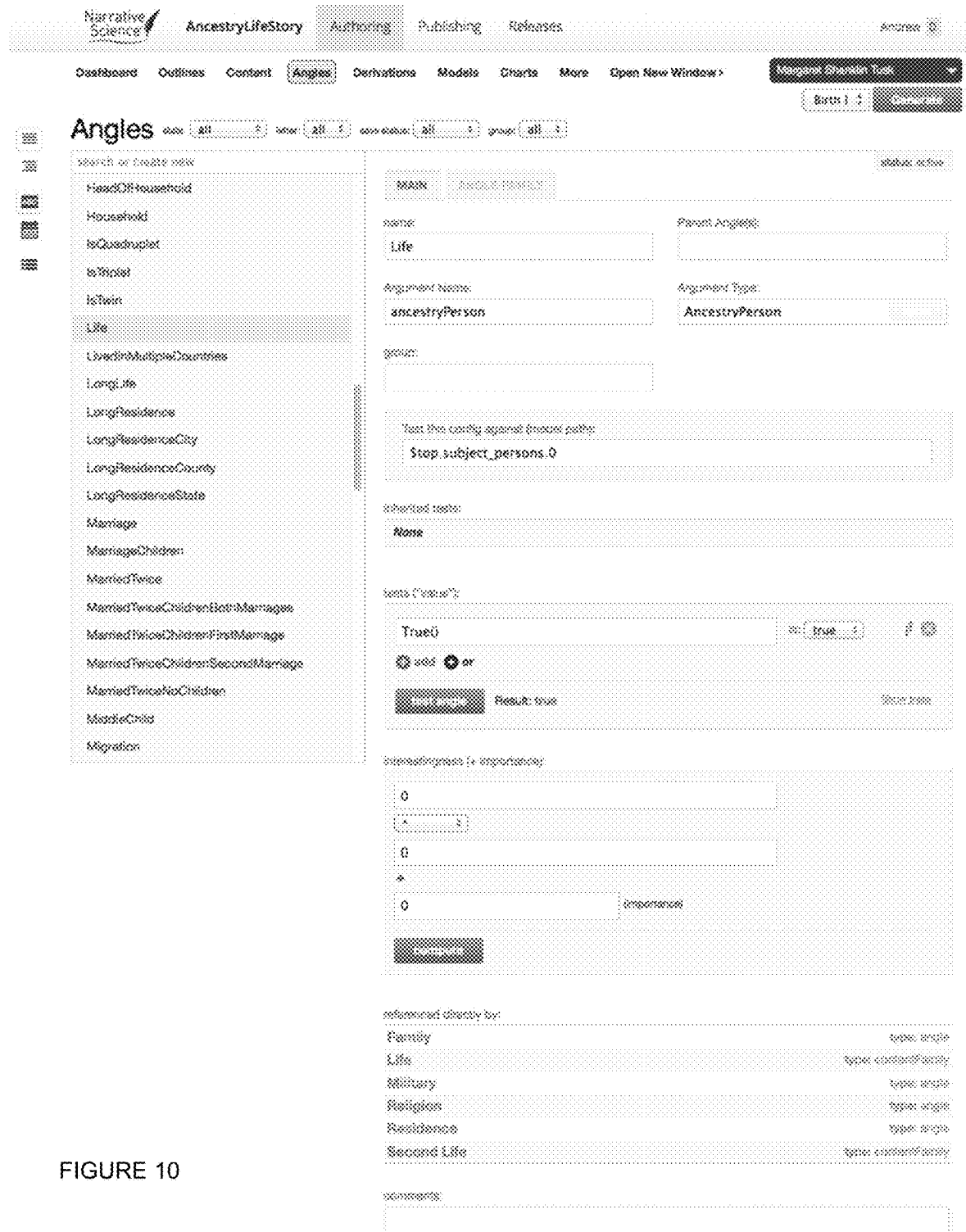
FIG. 10 illustrates the system presenting Angles to the user according to an exemplary embodiment.
Figure 10:
Figure 10:
Figure 10:
Figure 10:
Figure 10:

FIG. 10 illustrates how the system presents Angles to the user. The current set of Angles under development is presented and available for navigation on the left. This screen shows a parent Angle (which spans an Angle family). The system prompts users to enter the applicability conditions and interestingness/importance of the Angle, and automatically displays the other configuration elements that refer to the Angle.

Figure 11:
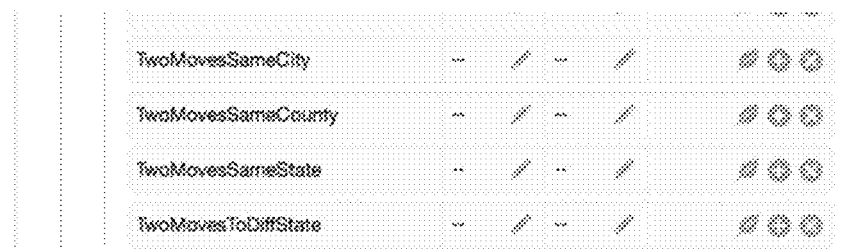
FIG. 11 illustrates the parent Angle of FIG. 10 fully expanded to display all the Angles it comprises according to an exemplary embodiment.
Figure 11:

FIG. 11 shows the parent Angle of FIG. 10 fully expanded to display all the Angles it comprises. The indentation structure displayed by the interface reflects the hierarchical structure of the Angle family in terms of shared (or, alternatively, disjoint) conditions of applicability. The conditions of applicability are expressed in terms of data accessed through the Model or of derived features.

Figure 12:
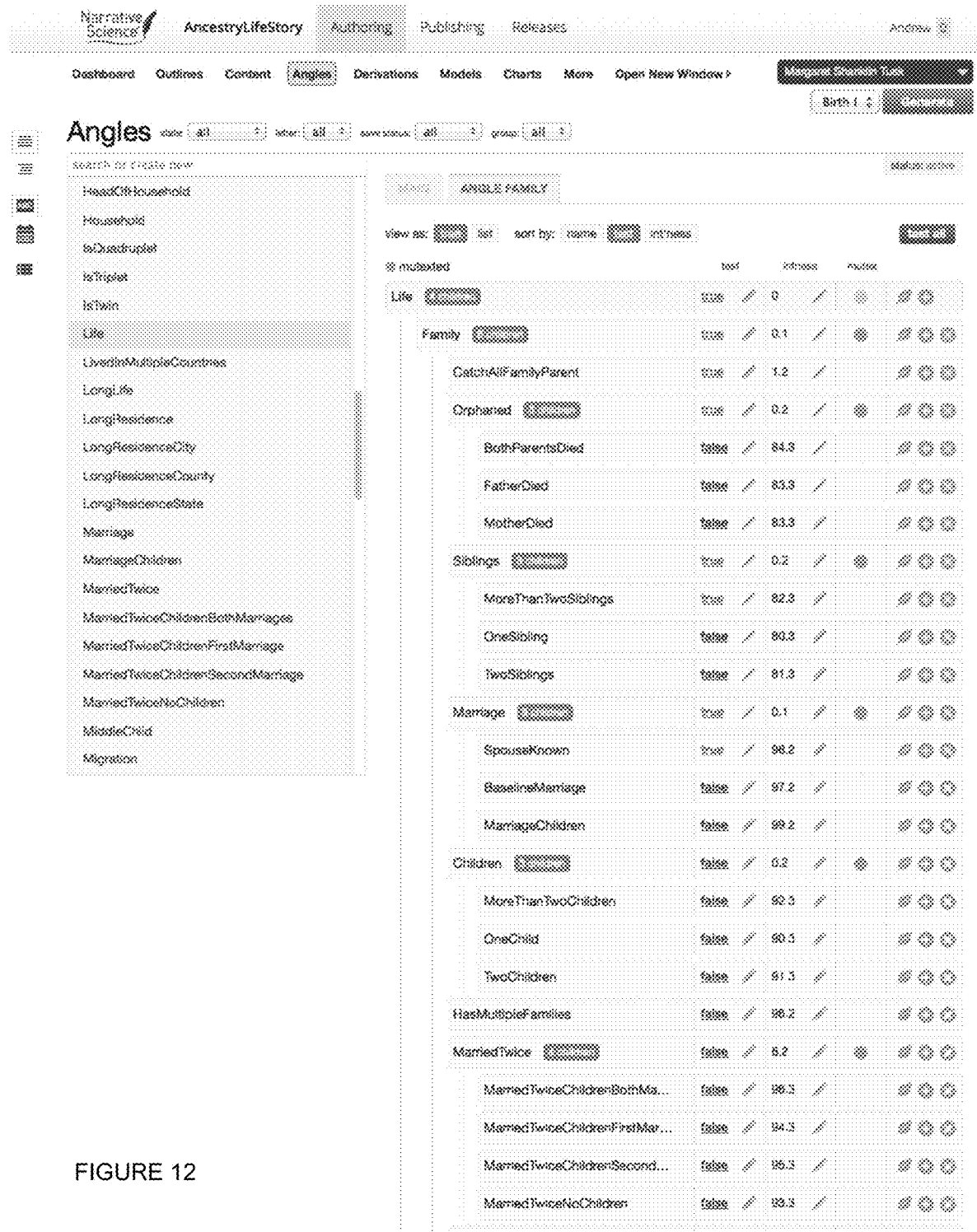
FIG. 12 illustrates the same list as FIG. 11, after the conditions of applicability have been tested on data determined by the user, which aids in finding errors in these conditions according to an exemplary embodiment.
Figure 12:
Figure 13:
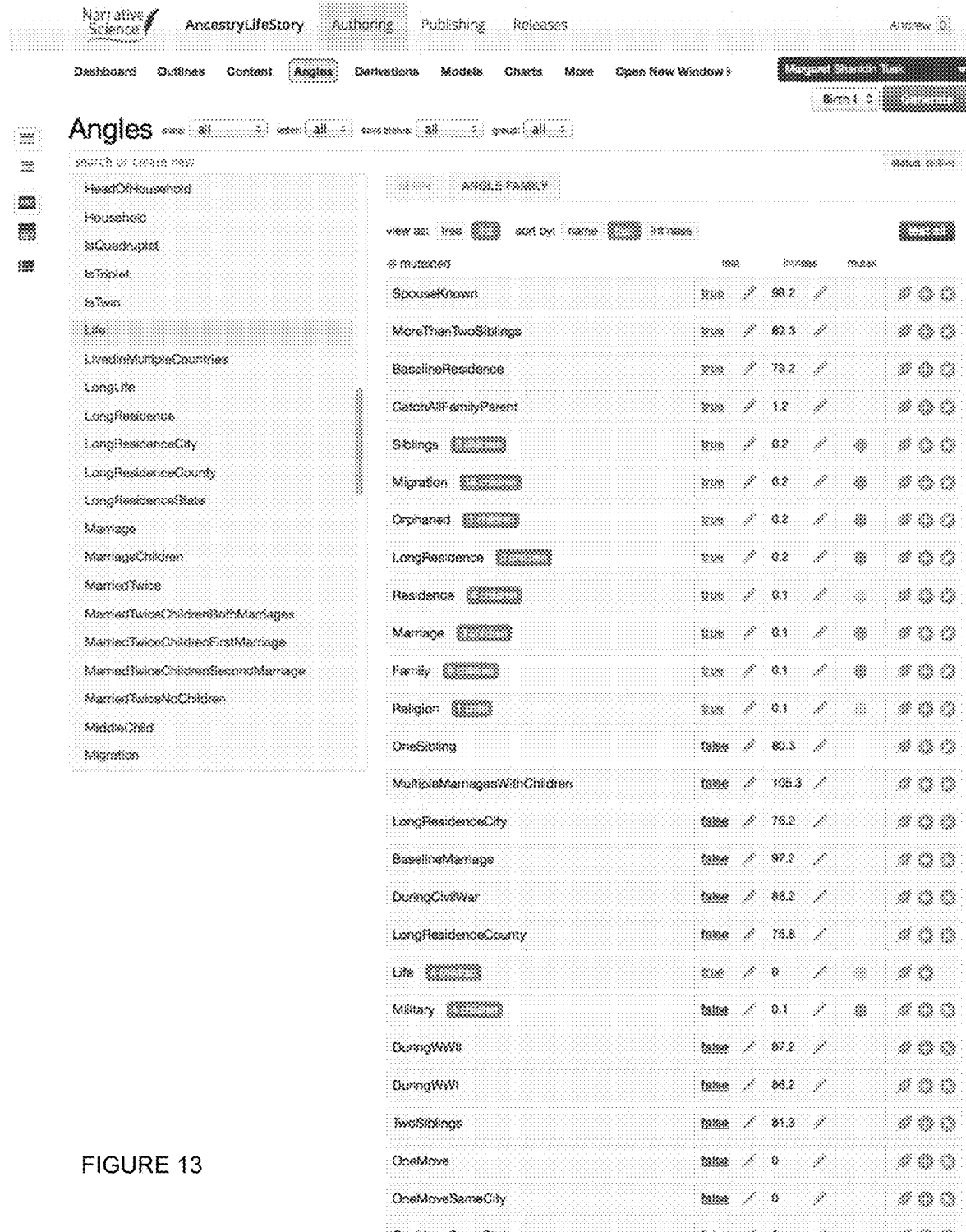
FIG. 13 illustrates how the Angles with true conditions sorted by interestingness according to an exemplary embodiment.
Figure 13:

FIG. 12 shows the same list, after the conditions of applicability have been tested on data determined by the user, which aids in finding errors in these conditions (those with true conditions are listed first). FIG. 13 additionally shows the Angles with true conditions sorted by interestingness, so that the Angle in this Angle family that would best characterize the selected data is shown at the top—again enabling the user to assess, incrementally, the current configuration of the Angles in this Angle family.

Figure 14:
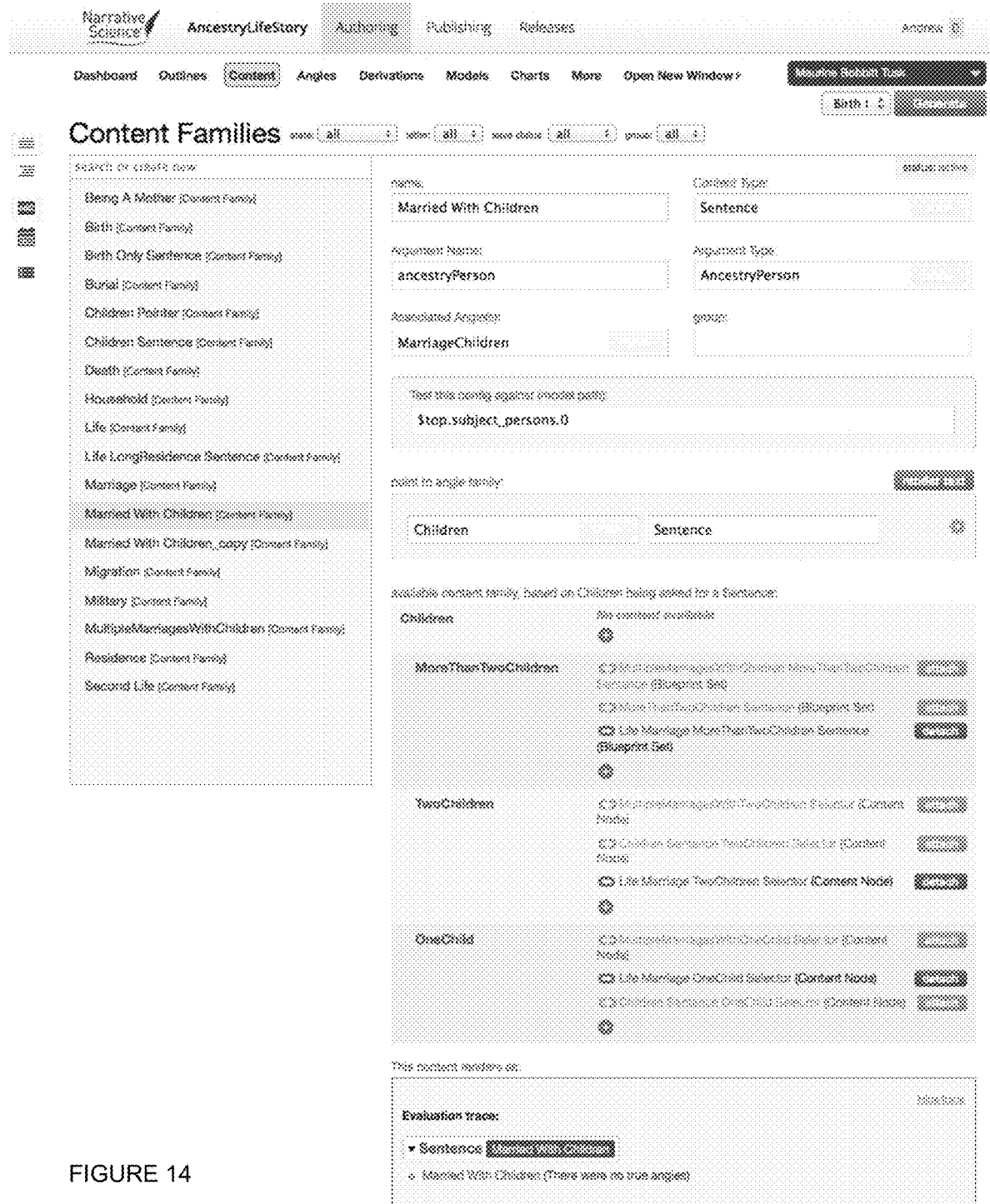
FIG. 14 illustrates the Content Blocks associated with one of the parent Angles according to an exemplary embodiment.
Figure 14:
Figure 14:
Figure 14:
Figure 14:
Figure 14:
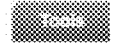
Figure 15:
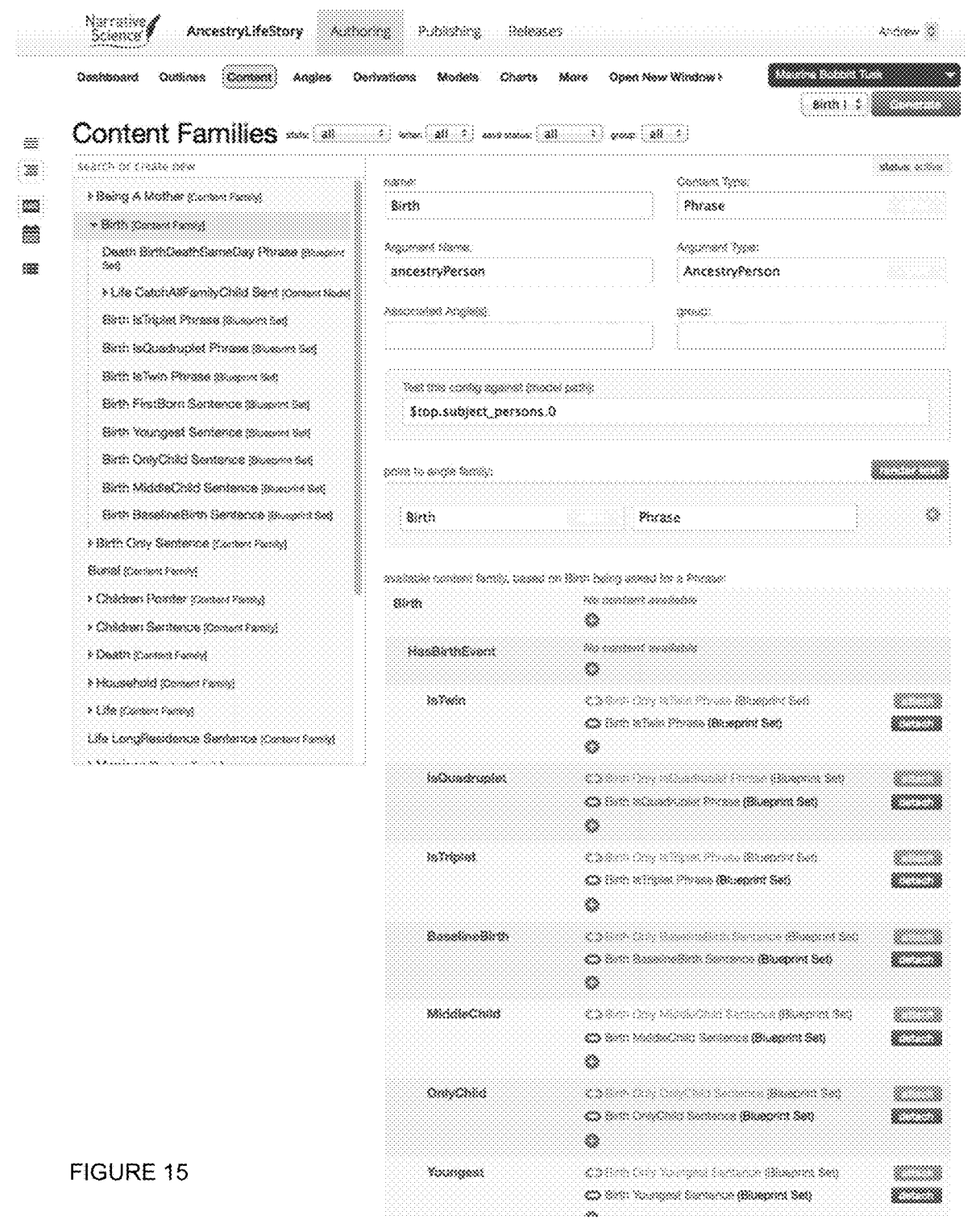
Figure 15:
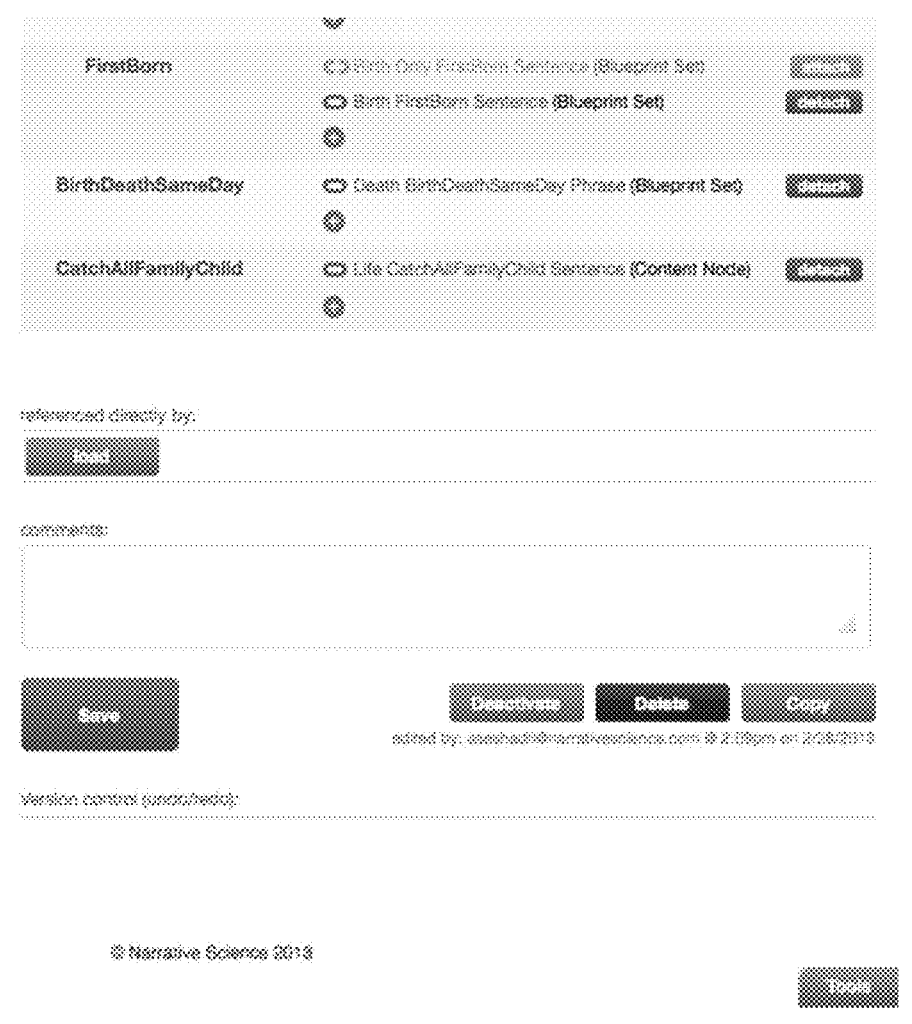

FIG. 14 displays the Content Blocks associated with one of the parent Angles previously displayed, specifically "MarriageChildren". These Content Blocks are associated with the individual Angles in that Angle family, which would apply depending on the conditions. The Content Blocks themselves contain other Content Blocks (which may be Content Nodes or Blueprint Sets); the user may edit the Content Blocks or add new Content Blocks if he or she believes that better or additional ways of expressing information associated with the specified Angle can be devised. The screen additionally indicates that no true Angle corresponding to this content is true given the selected data. FIG. 15 displays another set of Content Blocks in expanded form, so that all the content that might be expressed relating to the Angle in question can be viewed in context.

Figure 16:
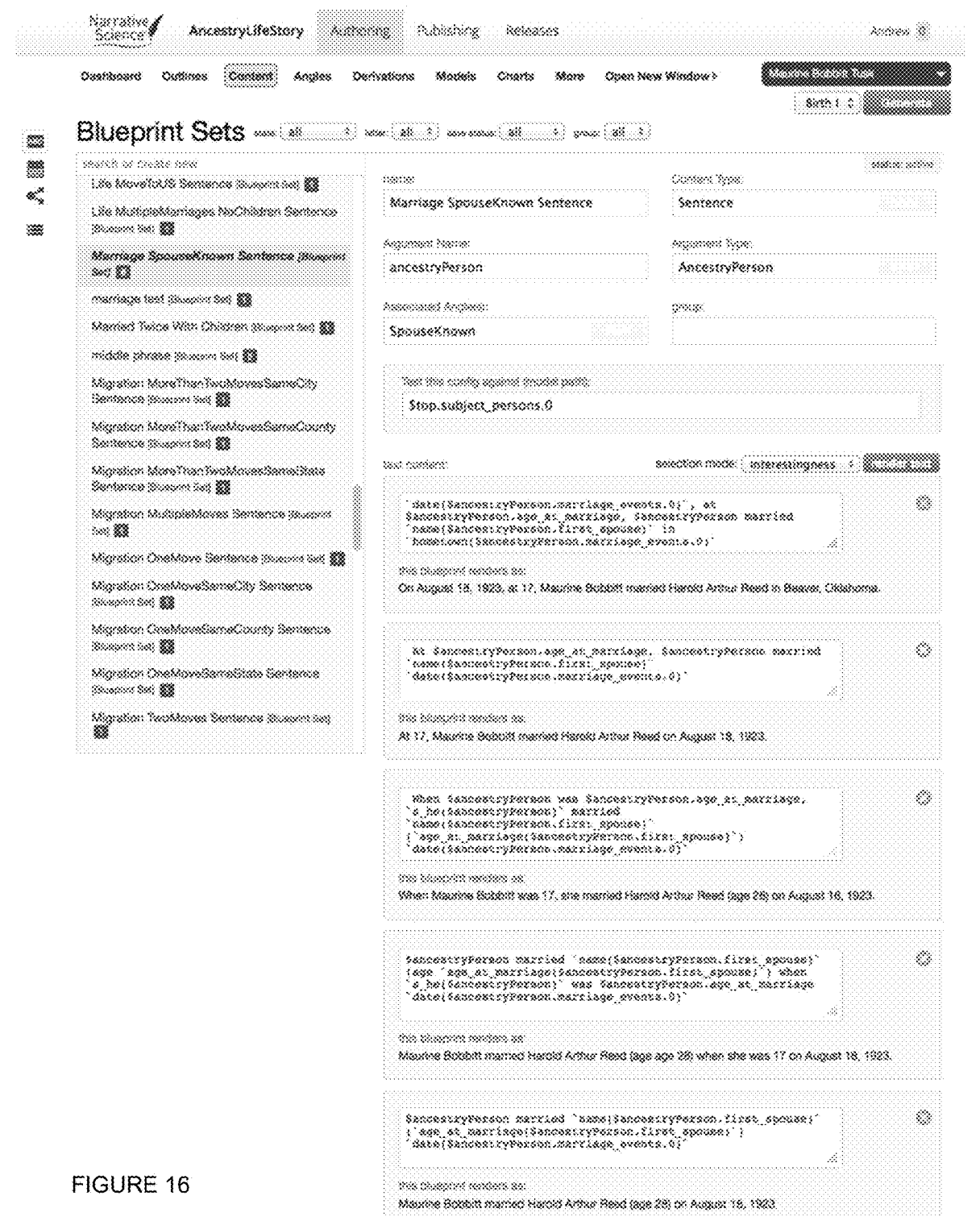
Figure 16:
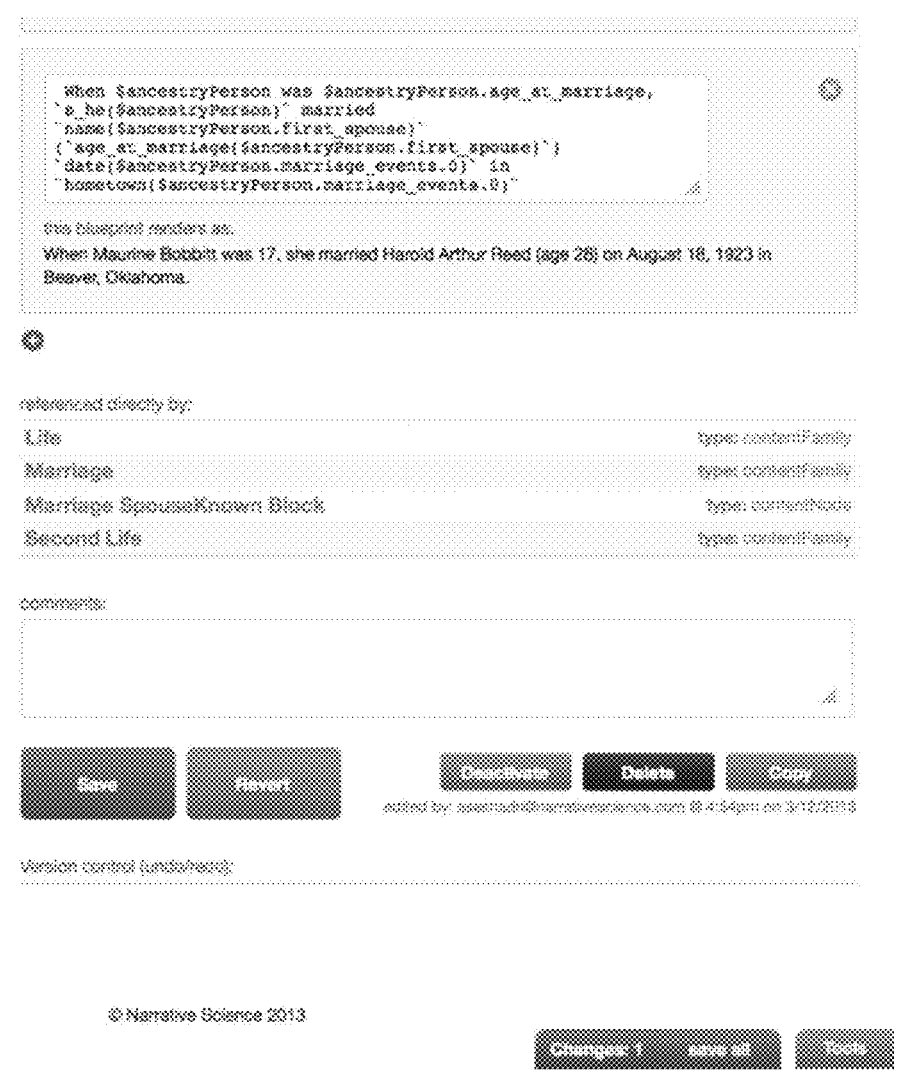
Figure 17:
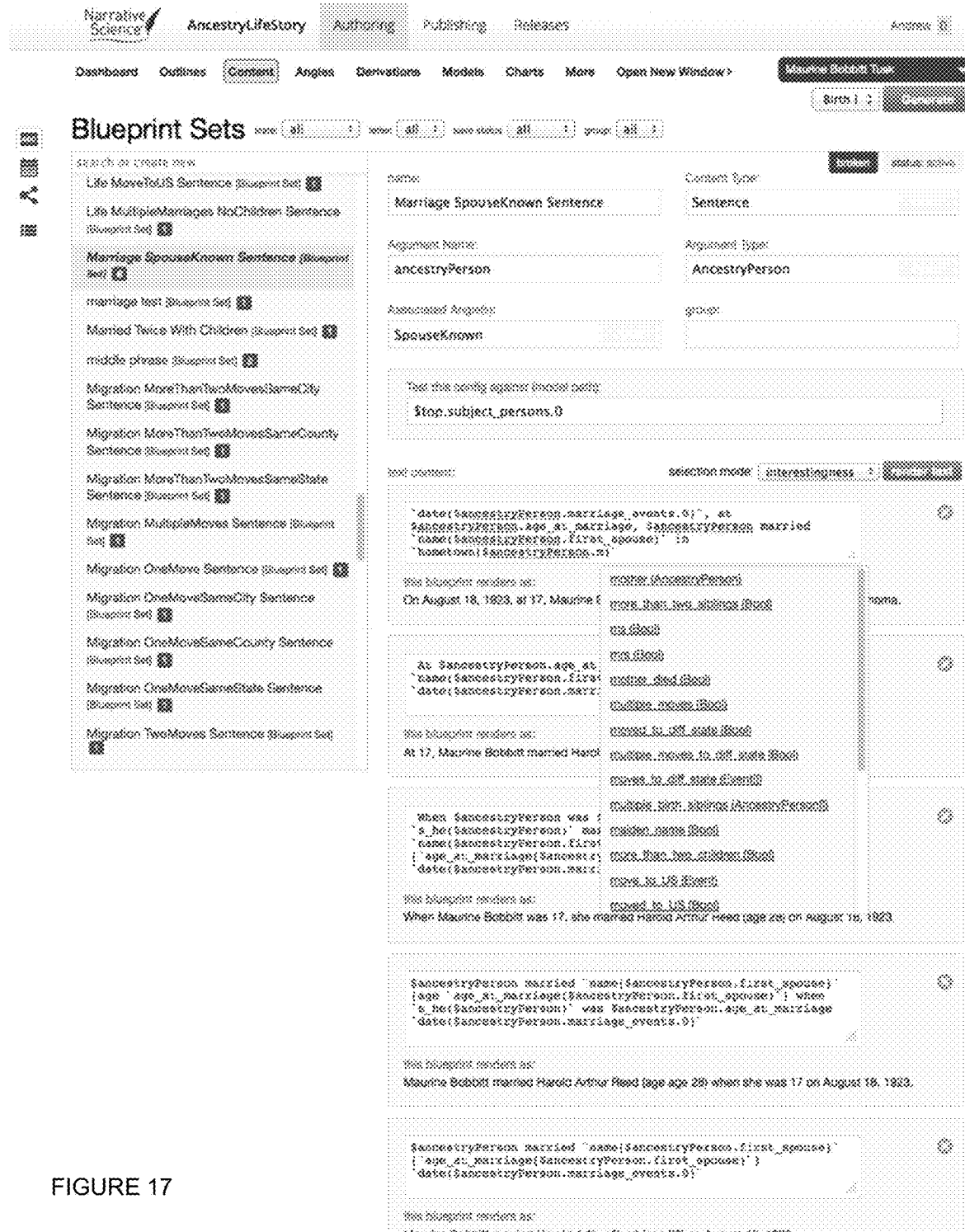
FIG. 17 illustrates a Blueprint Set with errors due to incorrect data references, along with suggestions by the system as to other data in the Models that the user might incorporate according to an exemplary embodiment.

FIG. 16 shows a Blueprint Set including a series of alternative ways of expressing the facts relevant to a given Angle in a given Content Block, notated through a combination of fixed natural language words and phrases, path names referencing the data in the Models, and Phraseblocks (which in turn render as appropriate phrases depending on conditions). The user may add new Blueprints. The system also shows how these Blueprints would render as natural language expressions given the currently selected data, in order that they can be assessed for clarity, grammaticality, etc. FIG. 17 shows a similar Blueprint Set with errors due to incorrect data references, along with suggestions by the system as to other data in the Models that the user might incorporate instead.

Figure 18:
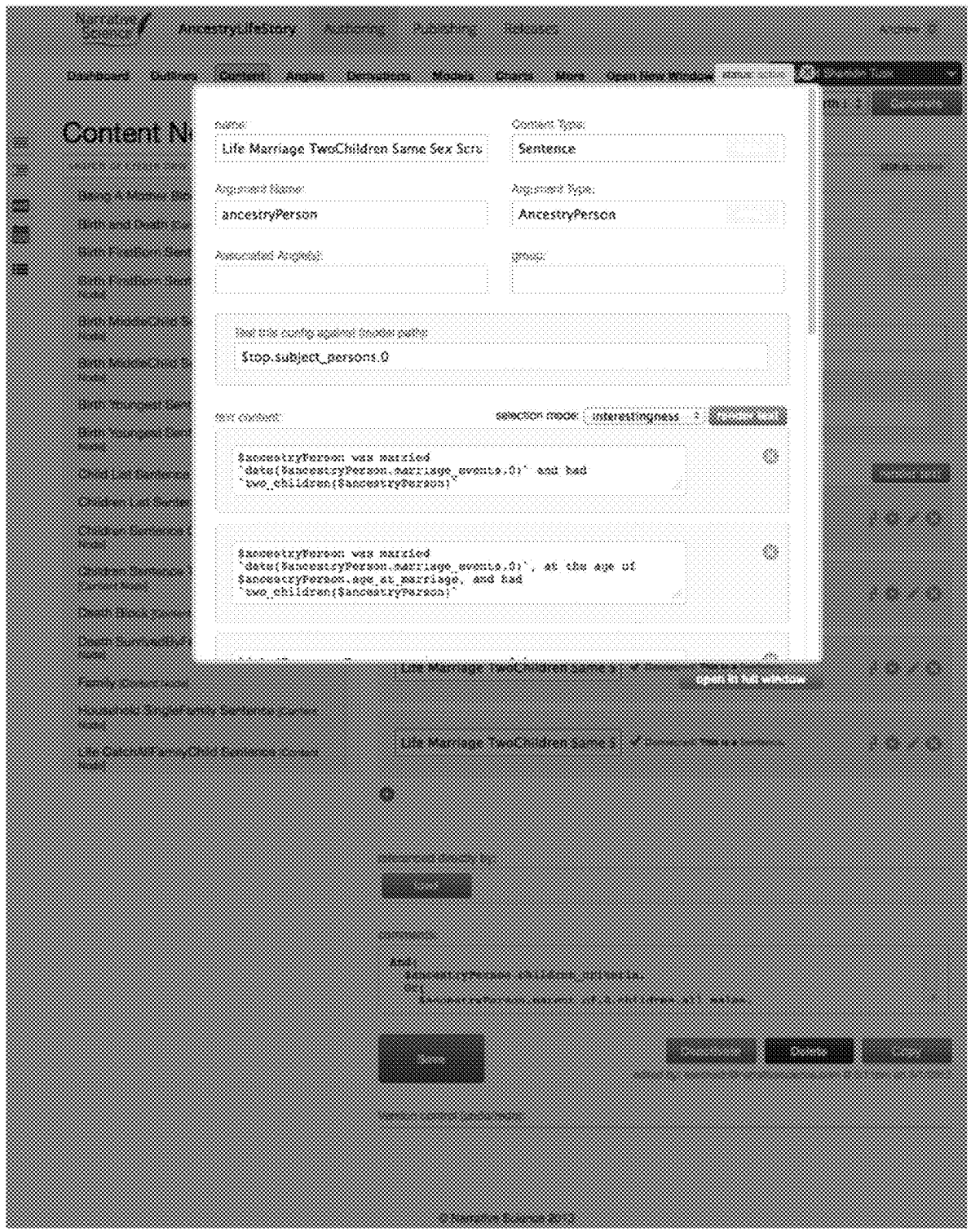
FIG. 18 illustrates general subordinate configuration elements that can be edited through modal dialog boxes according to an exemplary embodiment.

FIG. 18 shows that in general subordinate configuration elements can be edited through modal dialog boxes as well as direct navigation to a window displaying them. This enables easy refinement of these elements in the context of their use.

Figure 19:
FIG. 19 illustrates the editing of Phraseblocks according to an exemplary embodiment.
Figure 19:
Figure 19:
Figure 19:
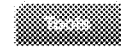
Figure 20:
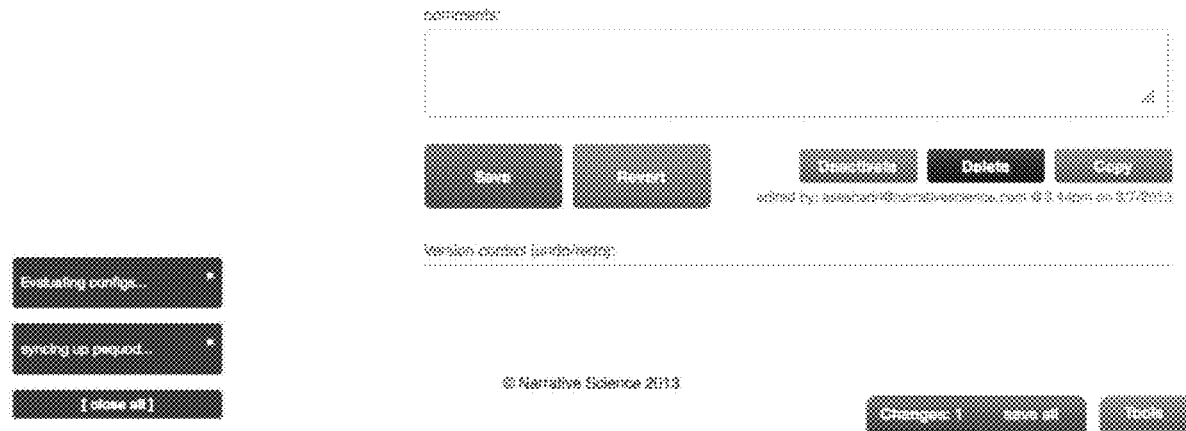
FIG. 20 illustrates the error message that would be generated if the configuration had an error in it according to an exemplary embodiment.

FIG. 19 shows the editing of Phraseblocks, which generate alternate phrases depending on conditions and can be incorporated into Blueprints. In this case for example, the Phraseblock generates different phrases to express the appropriate branch of the military in which the subject served. FIG. 20 shows the error message that would be generated if the configuration had an error in it so that it attempted to apply this Phraseblock to the wrong sort of data.

3. Providing Immediate Feedback During Configuration

As mentioned several times during the above discussion, a critical element of the method and system we have devised to support configuration is the ability to provide the user (editorial expert) with immediate feedback about the correctness (both syntactic and functional) of the configuration under development, and of the coherence and clarity of the result. This enables rapid and efficient iterative development and refinement of the configurations.

However to support this iterative development process, additional dataflow mechanisms must be developed beyond those required to generate stories from data on a production basis. In order to generate stories, the configurable narrative generation mechanism (or platform) must be given two inputs: One or more configurations, which determine the kinds of stories to be generated; and a flow of data about entities, events, situations, etc., which will be used as input to the configured mechanism in order to drive generation of stories about those entities, events, situations, etc., based on those data.

This is exactly what is required for a production workflow. For an iterative development workflow as described above, however, it does not suffice. Gaining feedback requires configuring the system, reading the data, generating the stories, and then examining the stories to see whether the configurations suffice—then changing the configurations if necessary and re-running the entire process again. Feedback on a more granular level—e.g., whether an individual Derivation or Blueprint appropriately configured—is not particularly easy in this approach.

In order to address this issue, the method and system for configuration that we have devised supports the relatively easy importation of sample data, and the evaluation of configuration elements on an individual basis using these sample data. This enables a much faster and more efficient configuration process from a user perspective.

Figure 21:
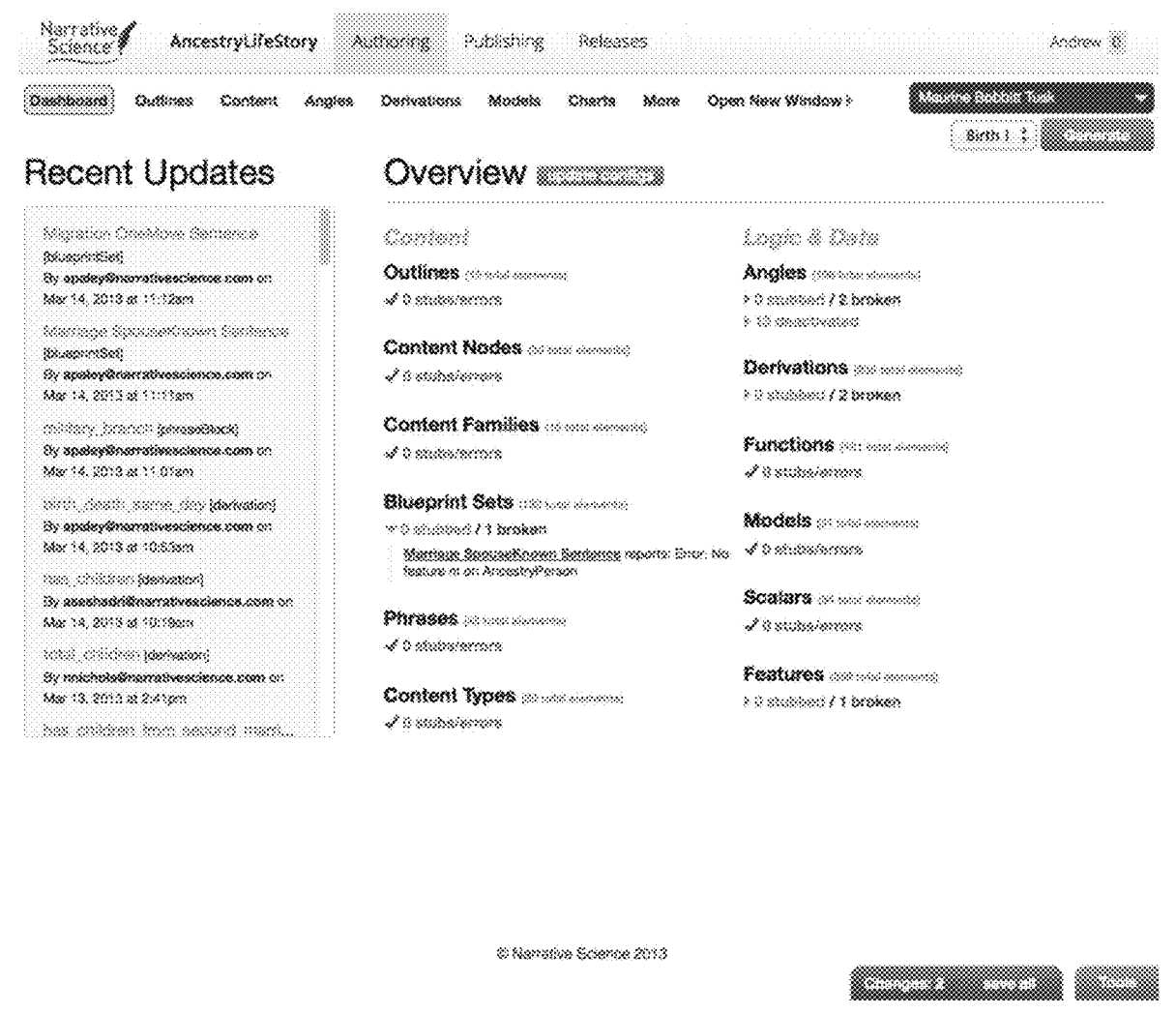
Figure 22:
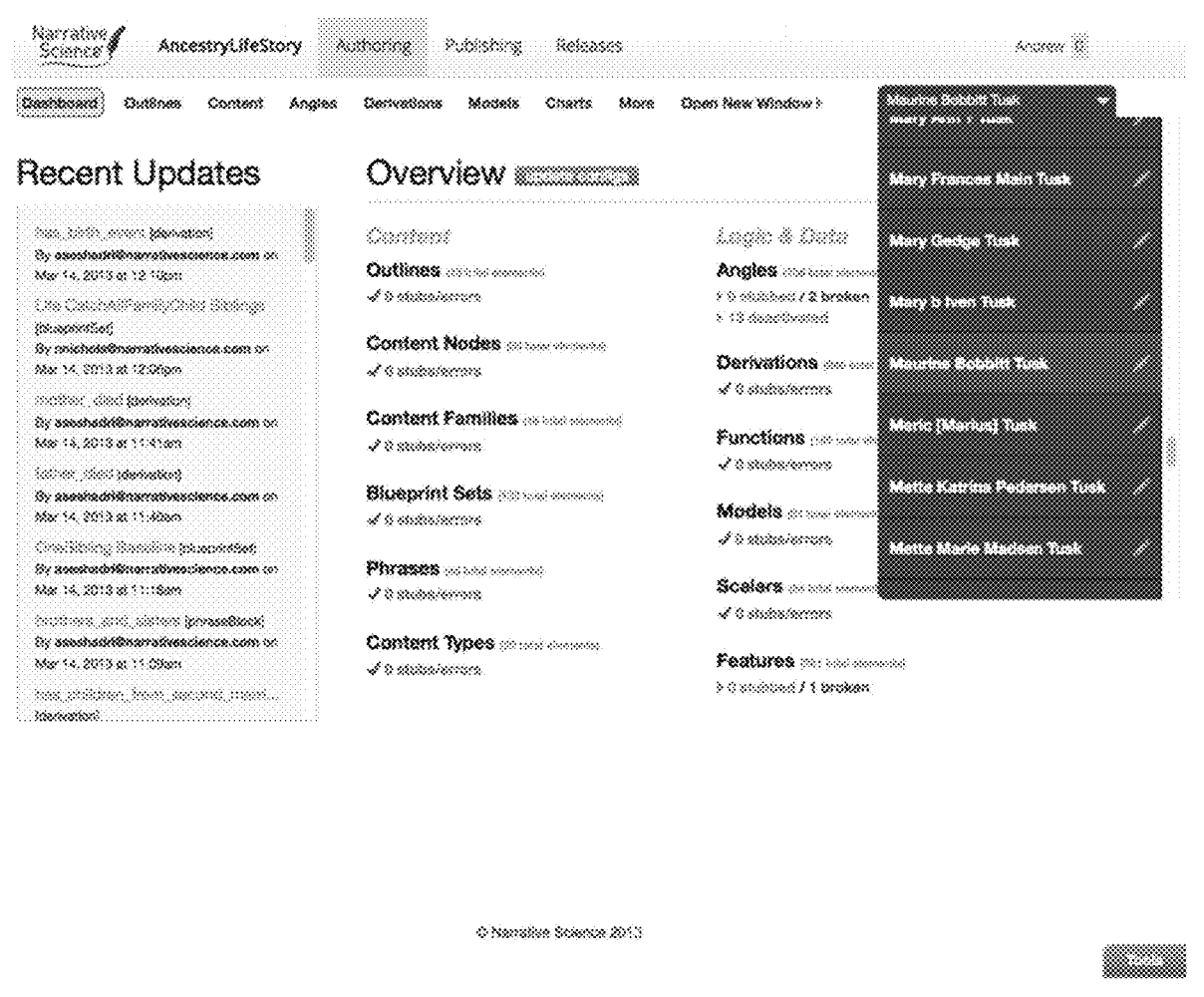
Figure 23:
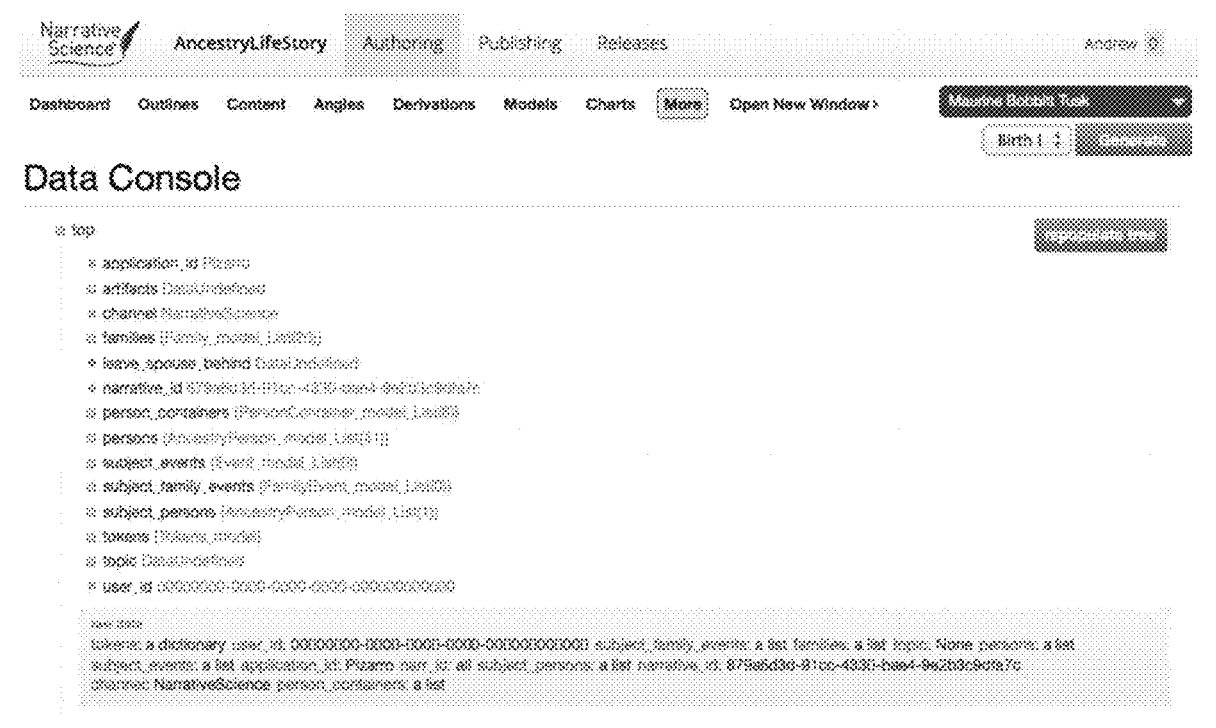

FIG. 21 shows the initial screen seen by a user upon returning to work on a configuration in progress. This screen shows the various configuration elements that have been developed already, as well as those which are entailed by previous elements but not yet developed. Most significant in the context of this discussion is the drop-down menu in the upper right hand corner labeled "Maurine Bobbit Tusk". This menu controls the importation of sample data (in this instance concerning a deceased individual named Maurine Bobbit). FIG. 22 shows that the configuration tool has currently been loaded with a number of different sets of sample data. The user is free to choose whichever data set will help to check and refine the configuration best in his or her judgment. FIG. 23 illustrates a portion of a Model with sample data loaded into it.

Figure 24:
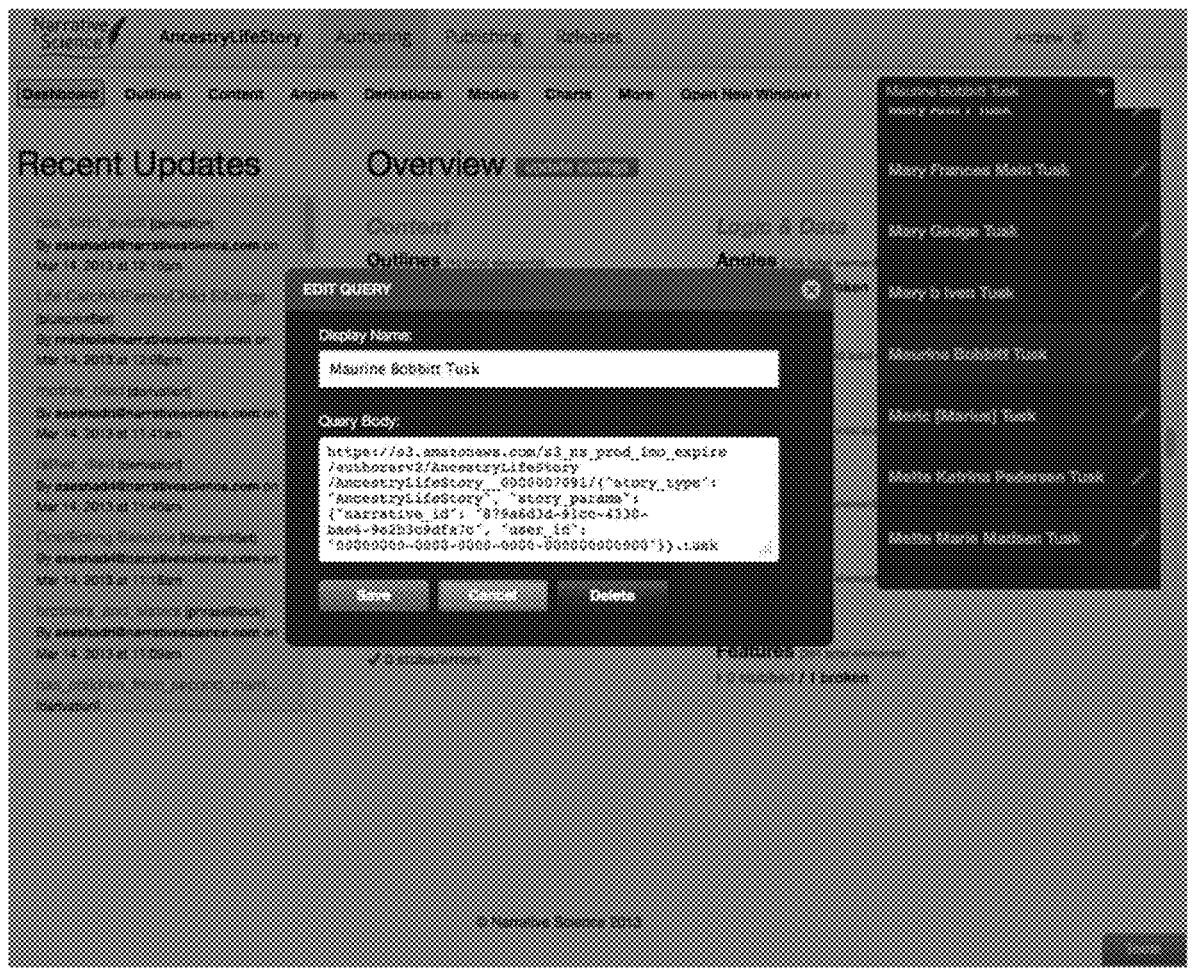
FIG. 24 illustrates the database query that has been written in order to import a sample data set according to an exemplary embodiment.

FIG. 24 shows the database query that has been written in order to import a sample data set. This query would typically be written by an engineer or with the aid of one, rather than the user (editorial expert) him or herself.

Figure 25:
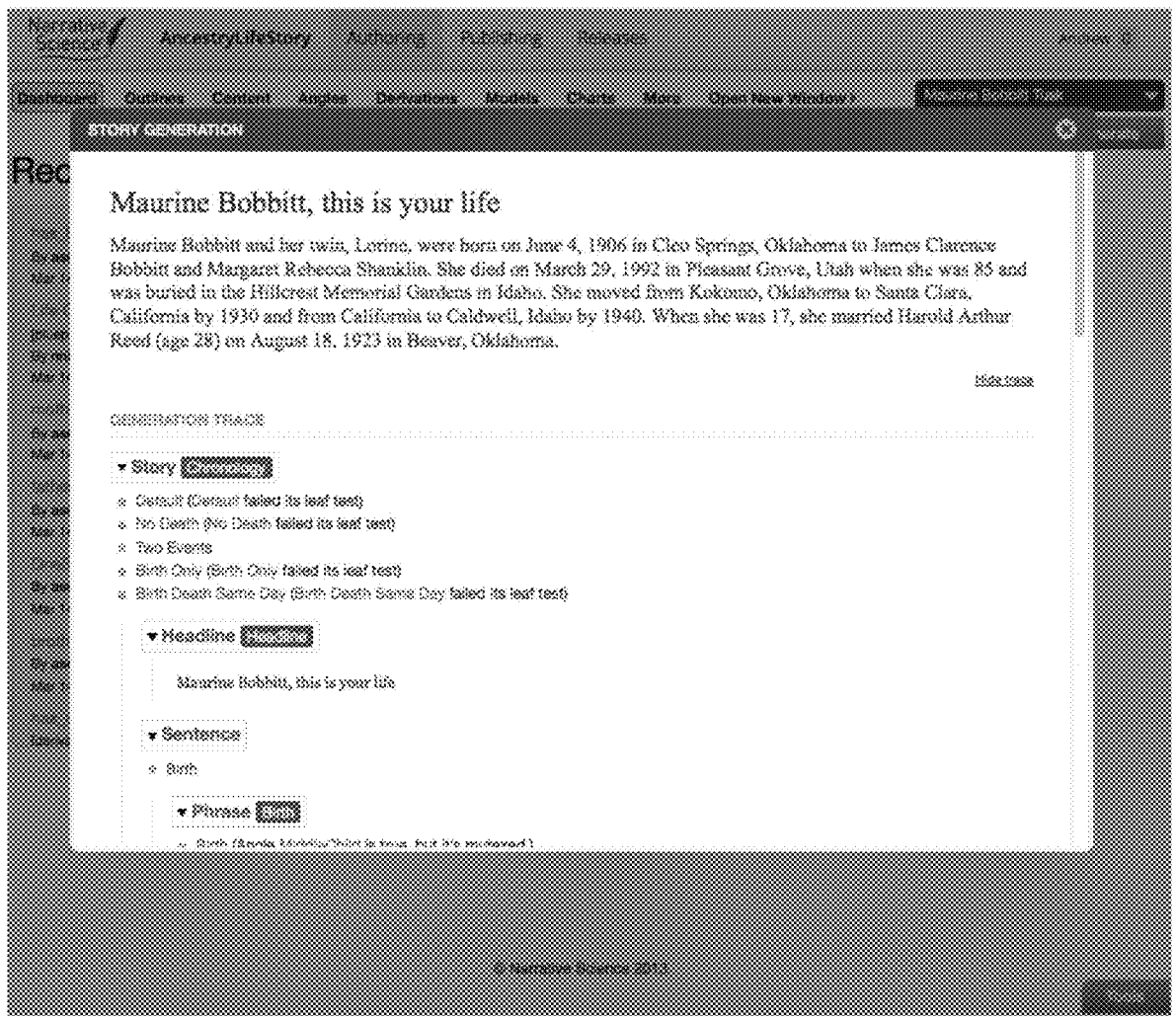
FIG. 25 illustrates an error messages and trace capabilities provide by the configuration tool when generating an entire story according to an exemplary embodiment.
Figure 26:
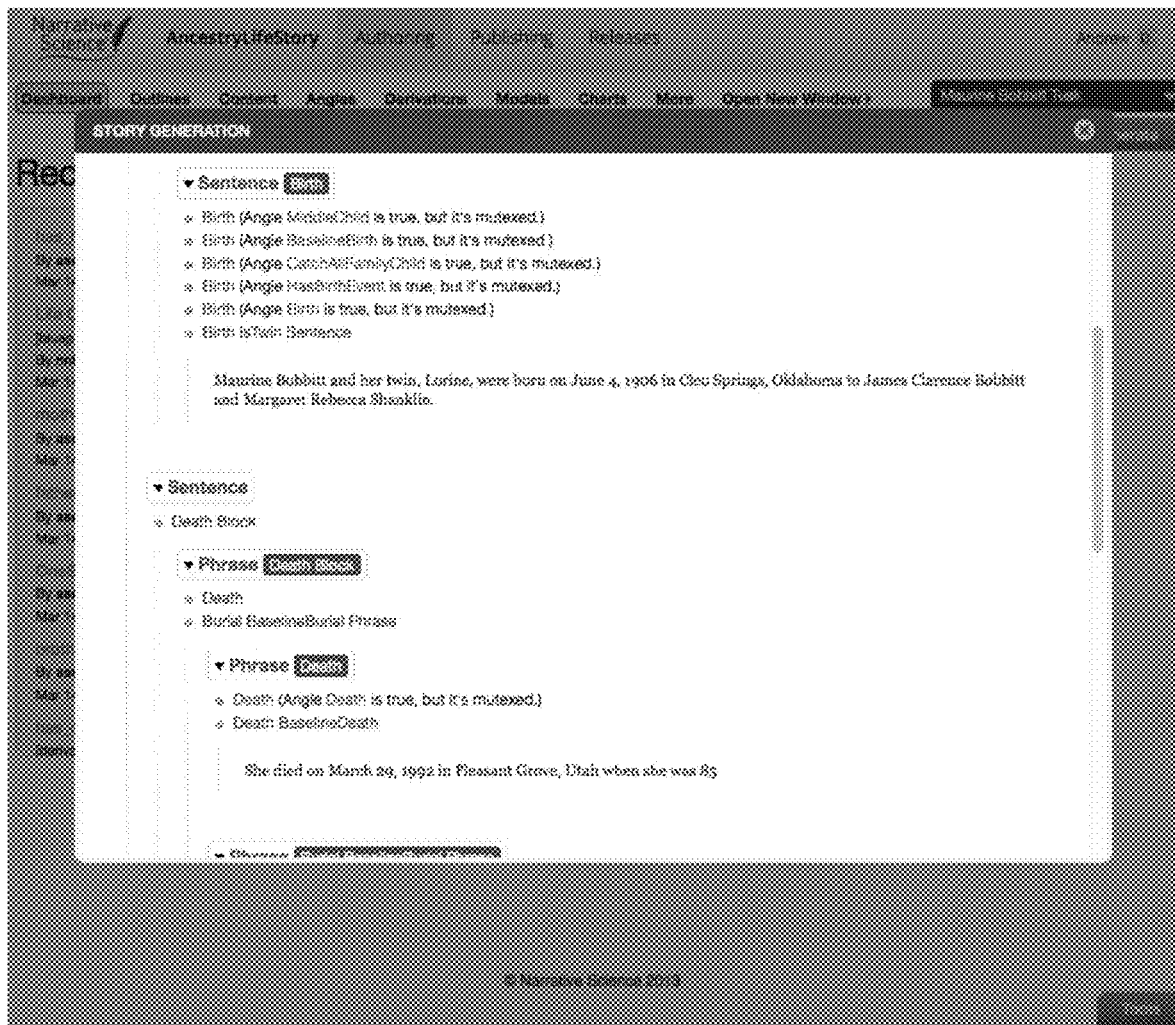
FIG. 26 illustrates an error messages and trace capabilities provide by the configuration tool when generating an entire story according to an exemplary embodiment.

Finally, while some incremental testing has been illustrated in the above description, FIGS. 25 and 26 illustrate the error messages and trace capabilities provide by the configuration tool when generating an entire story from start to end.

In sum, the ability to import sample data for direct use by the configuration tool itself, as described here, significantly improves the efficiency and effectiveness of the configuration process from the viewpoint of the human user developing the configurations.

While the present invention has been described above in relation to exemplary embodiments, various modifications may be made thereto that still fall within the invention's scope, as would be recognized by those of ordinary skill in the art. Such modifications to the invention will be recognizable upon review of the teachings herein. As such, the full scope of the present invention is to be defined solely by the appended claims and their legal equivalents.

What is claimed is:

1. An apparatus for controlling how a narrative story about a data set is generated, the data set comprising structured data that comprises numeric data that falls into a plurality of fields and/or categories about a plurality of entities, the apparatus comprising:
   a processor configured to:
      generate a plurality of graphical user interfaces (GUIs) for interaction with a user to support configuration of a narrative story generator, wherein the configuration defines how the narrative story generator is to ingest, organize, and process the data set for the narrative story generator to understand how to analyze and interpret the data set in order to automatically generate the narrative story about the data set, wherein the GUIs comprise:
         at least one GUI through which the user specifies a plurality of data models that model the data set, the data models comprising model components that organize structured data about a plurality of the entities within the data set, wherein the model components include specifications of (1) the entities, (2) relationships among a plurality of the entities and (3) features of a plurality of the entities;
         at least one GUI through which the user specifies a plurality of derivations that comprise aggregations or other functions whose values are determined by the structured data organized by the data models;
         at least one GUI through which the user specifies a plurality of angles that define characterizations of the data set, the characterizations associated with a plurality of specified applicability conditions expressed in terms of the model components for testing to determine whether the associated characterizations are applicable to the data set; and
         at least one GUI through which the user (i) specifies a plurality of components of the data model, a plurality of the derivations, and a plurality of the angles for inclusion in a plurality of content blocks and (ii) assembles the content blocks into a story outline that organizes the content blocks in a hierarchical structure;
      create the configuration based on user inputs through the GUIs, wherein the configuration includes the story outline;
      process the configuration in coordination with the data set by (1) ingesting and organizing the data set for analysis based on the specified data models, (2) computing the specified derivations based on the ingested and organized data set, and (3) analyzing the ingested and organized data set including testing (i) structured data within the ingested and organized data set and/or (ii) the derivations, the testing being performed against the specified applicability conditions of the specified angles within the story outline to determine whether any of the characterizations associated with the tested specified applicability conditions are applicable to the data set and are to be expressed by natural language in the narrative story; and generate the narrative story based on the processed configuration and the data set, wherein the narrative story describes the data set and expresses a determined applicable characterization using natural language in accordance with the story outline from the processed configuration.

2. The apparatus of claim 1 wherein the processor is further configured to (1) generate a test narrative story based on the configuration using an imported sample data set, (2) evaluate at least one of the derivations and/or angles included within the outline with respect to the test narrative story and the imported sample data set, and (3) provide feedback through at least one of the GUIs that indicates whether the evaluated derivations and/or angles operated correctly with respect to the generation of the test narrative story.

3. The apparatus of claim 1 wherein the processor is further configured to navigate among the GUIs in any of a plurality of user-defined sequences.

4. The apparatus of claim 3 wherein the user-defined sequences include a top down sequence that progresses from the at least one GUI for specification of content blocks and assembly of the story outline, to the at least one GUI for specification of the angles, to the at least one GUI for specification of the derivations, and to the at least one GUI for specification of the data model.

5. The apparatus of claim 3 wherein the user-defined sequences include a bottom up sequence that progresses from the at least one GUI for specification of the data model, to the at least one GUI for specification of the derivations, to the at least one GUI for specification of the angles, and to the at least one GUI for specification of content blocks and assembly of the story outline.

6. The apparatus of claim 1 wherein the processor is further configured to be switchable between (1) an authoring mode for creating the configuration through the GUIs and (2) a publishing mode for the generation of the narrative story.

7. The apparatus of claim 1 wherein the at least one GUI through which the user specifies the derivations is configured to receive input from the user that specifies how the derivations are to be computed in terms of components of the data model.

8. The apparatus of claim 1 wherein the at least one GUI through which the user specifies the angles is configured to receive input from the user that specifies the applicability conditions in terms of components of the data model and/or the derivations.

9. The apparatus of claim 1 wherein the GUIs further comprise at least one GUI through which the user specifies natural language words and phrases for expressing facts relevant to specified angles within a specified content block of the story outline.

10. A method for controlling how a narrative story about a data set is generated, the data set comprising structured data that comprises numeric data that falls into a plurality of fields and/or categories, the method comprising:

generating a plurality of graphical user interfaces (GUIs) for interaction with a user to support configuration of a narrative story generator, wherein the configuration defines how the narrative story generator is to ingest, organize, and process the data set for the narrative story generator to understand how to analyze and interpret the data set in order to automatically generate the narrative story about the data set, wherein the GUIs comprise:

at least one GUI through which the user specifies a plurality of data models that model the data set, the data models comprising model components that organize structured data about a plurality of the entities within the data set, wherein the model components include specifications of (1) the entities, (2) relationships among a plurality of the entities and (3) features of a plurality of the entities;

at least one GUI through which the user specifies a plurality of derivations that comprise aggregations or other functions whose values are determined by the structured data organized by the data models;

at least one GUI through which the user specifies a plurality of angles that define characterizations of the data set, the characterizations associated with a plurality of specified applicability conditions expressed in terms of the model components for testing to determine whether the associated characterizations are applicable to the data set; and at least one GUI through which the user (i) specifies a plurality of components of the data model, a plurality of the derivations, and a plurality of the angles for inclusion in a plurality of content blocks and (ii) assembles the content blocks into a story outline that organizes the content blocks in a hierarchical structure;

creating the configuration based on user inputs through the GUIs, wherein the configuration includes the story outline;

processing the configuration in coordination with the data set, wherein the processing includes (1) ingesting and organizing the data set for analysis based on the specified data models, (2) computing the specified derivations based on the ingested and organized data set, and (3) analyzing the ingested and organized data set including testing (i) structured data within the ingested and organized data set and/or (ii) the derivations, the testing being performed against the specified applicability conditions of the specified angles within the story outline to determine whether any of the characterizations associated with the tested specified applicability conditions are applicable to the data set and are to be expressed by natural language in the narrative story; and generating the narrative story based on the processed configuration and the data set, wherein the narrative story describes the data set and expresses a determined applicable characterization using natural language in accordance with the story outline from the processed configuration.

11. The method of claim 10 further comprising:

the processor generating a test narrative story based on the configuration using an imported sample data set;

the processor evaluating at least one of the derivations and/or angles included within the outline with respect to the test narrative story and the imported sample data set; and the processor providing feedback through at least one of the GUIs that indicates whether the evaluated derivations and/or angles operated correctly with respect to the generation of the test narrative story.

12. The method of claim 10 further comprising:
the processor navigating among the GUIs in any of a plurality of user-defined sequences.

13. The method of claim 12 wherein the user-defined sequences include a top down sequence that progresses from the at least one GUI for specification of content blocks and assembly of the story outline, to the at least one GUI for specification of the angles, to the at least one GUI for specification of the derivations, and to the at least one GUI for specification of the data model.

14. The method of claim 12 wherein the user-defined sequences include a bottom up sequence that progresses from the at least one GUI for specification of the data model, to the at least one GUI for specification of the derivations, to the at least one GUI for specification of the angles, and to the at least one GUI for specification of content blocks and assembly of the story outline.

15. The method of claim 10 further comprising:
the processor switching between (1) an authoring mode for creating the configuration through the GUIs and (2) a publishing mode for the generation of the narrative story in response to user input.

16. The method of claim 10 further comprising:
the processor receiving input via the at least one GUI through which the user specifies the derivations, wherein the received input specifies how the derivations are to be computed in terms of components of the data model.

17. The method of claim 10 further comprising:
the processor receiving input via the at least one GUI through which the user specifies the angles, wherein the received input specifies the applicability conditions in terms of components of the data model and/or the derivations.

18. The method of claim 10 wherein the GUIs further comprise at least one GUI through which the user specifies natural language words and phrases for expressing facts relevant to specified angles within a specified content block of the story outline.

19. The method of claim 10 wherein the user comprises a plurality of users.

20. A computer program product for controlling how a narrative story about a data set is generated, the data set comprising structured data that comprises numeric data that falls into a plurality of fields and/or categories about a plurality of entities, the computer program product comprising:
a plurality of instructions executable by a processor and resident on a non-transitory computer-readable storage medium, wherein the instructions, upon execution by the processor, are configured to cause the processor to:
generate a plurality of graphical user interfaces (GUIs) for interaction with a user to support configuration of a narrative story generator, wherein the configuration defines how the narrative story generator is to ingest, organize, and process the data set for the narrative story generator to understand how to analyze and interpret the data set in order to automatically generate the narrative story about the data set, wherein the GUIs comprise:
at least one GUI through which the user specifies a plurality of data models that model the data set, the data models comprising model components that organize structured data about a plurality of the entities within the data set, wherein the model components include specifications of (1) the entities, (2) relationships among a plurality of the entities and (3) features of a plurality of the entities;
at least one GUI through which the user specifies a plurality of derivations that comprise aggregations or other functions whose values are determined by the structured data organized by the data models;
at least one GUI through which the user specifies a plurality of angles that define characterizations of the data set, the characterizations associated with a plurality of specified applicability conditions expressed in terms of the model components for testing to determine whether the associated characterizations are applicable to the data set; and
at least one GUI through which the user (i) specifies a plurality of components of the data model, a plurality of the derivations, and a plurality of the angles for inclusion in a plurality of content blocks and (ii) assembles the content blocks into a story outline that organizes the content blocks in a hierarchical structure;
create the configuration based on user inputs through the GUIs, wherein the configuration includes the story outline;
process the configuration in coordination with the data set by (1) ingesting and organizing the data set for analysis based on the specified data models, (2) computing the specified derivations based on the ingested and organized data set, and (3) analyzing the ingested and organized data set including testing (i) structured data within the ingested and organized data set and/or (ii) the derivations, the testing being performed against the specified applicability conditions of the specified angles within the story outline to determine whether any of the characterizations associated with the tested specified applicability conditions are applicable to the data set and are to be expressed by natural language in the narrative story; and
generate the narrative story based on the processed configuration and the data set, wherein the narrative story describes the data set and expresses a determined applicable characterization using natural language in accordance with the story outline from the processed configuration.

* * * * *